United States Patent
Xu et al.

(10) Patent No.: US 12,105,877 B2
(45) Date of Patent: Oct. 1, 2024

(54) HAPTIC STIMULATION SYSTEMS AND METHODS

(71) Applicant: Huawei Technologies Co., Ltd., Shenzhen (CN)

(72) Inventors: Jun Xu, Santa Clara, CA (US); Fei Liu, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 17/373,380

(22) Filed: Jul. 12, 2021

(65) Prior Publication Data

US 2021/0342007 A1    Nov. 4, 2021

Related U.S. Application Data

(63) Continuation of application No. PCT/CN2019/083561, filed on Apr. 20, 2019.

(60) Provisional application No. 62/792,642, filed on Jan. 15, 2019.

(51) Int. Cl.
| | |
|---|---|
| *G06F 3/01* | (2006.01) |
| *G06F 3/03* | (2006.01) |
| *G10L 21/10* | (2013.01) |
| *G10L 21/16* | (2013.01) |

(52) U.S. Cl.
CPC ............ *G06F 3/016* (2013.01); *G06F 3/03* (2013.01); *G10L 21/10* (2013.01); *G10L 21/16* (2013.01)

(58) Field of Classification Search
CPC . G06F 3/016; G06F 3/03; G10L 21/10; G10L 21/16; B06B 2201/76; B06B 1/0622
See application file for complete search history.

(56) References Cited

U.S. PATENT DOCUMENTS

| | | | |
|---|---|---|---|
| 6,278,441 B1 | 8/2001 | Gouzman et al. | |
| 6,326,901 B1* | 12/2001 | Gonzales | G09B 21/003 340/407.1 |
| 6,762,749 B1* | 7/2004 | Gouzman | G06F 3/03544 434/114 |
| 10,269,223 B2* | 4/2019 | Kerdemelidis | G08B 6/00 |
| 2008/0246737 A1* | 10/2008 | Benali-Khoudja | G09B 21/003 345/173 |
| 2010/0238005 A1* | 9/2010 | White | G08B 6/00 340/407.2 |
| 2011/0285637 A1 | 11/2011 | Karkkainen | |
| 2013/0207904 A1 | 8/2013 | Short et al. | |

(Continued)

FOREIGN PATENT DOCUMENTS

| | | | | |
|---|---|---|---|---|
| DE | 202014003427 U1 * | 7/2014 | ............ | G06F 3/033 |
| JP | 2005091622 A * | 4/2005 | | |
| WO | 9716035 A1 | 5/1997 | | |

*Primary Examiner* — Quan Zhen Wang
*Assistant Examiner* — Mancil Littlejohn, Jr.
(74) *Attorney, Agent, or Firm* — Conley Rose, P.C.

(57) ABSTRACT

The disclosure relates to technology for haptic stimulation. According to one aspect of the present disclosure, there is provided a haptic stimulation system comprising a haptic stimulation interface comprising a pattern of stimulation elements configured to stimulate receptors in skin of a user. The haptic stimulation system further comprises a control circuit configured to present information in the haptic stimulation interface in accordance with a presentation mode that is tailored to the user.

20 Claims, 24 Drawing Sheets

(56) References Cited

U.S. PATENT DOCUMENTS

| | | | |
|---|---|---|---|
| 2014/0002474 A1* | 1/2014 | Ashbrook | G06T 19/20 |
| | | | 345/589 |
| 2014/0020087 A1* | 1/2014 | Ooi | G06F 21/36 |
| | | | 726/19 |
| 2018/0074592 A1 | 3/2018 | Birnbaum et al. | |

* cited by examiner

HAPTIC STIMULATION SYSTEMS AND METHODS

CROSS-REFERENCE TO RELATED APPLICATIONS

This application is a continuation of International Application No. PCT/CN2019/083561 filed on Apr. 20, 2019, by Huawei Technologies Co., Ltd., and titled "Haptic Simulation Systems and Methods," which claims the benefit of U.S. Provisional Patent Application No. 62/792,642 filed Jan. 15, 2019, by Jun Xu, et al., and titled "Haptic Simulation Systems and Methods," which are hereby incorporated by reference in their entireties.

TECHNICAL FIELD

The disclosure generally relates to haptic stimulation technology.

BACKGROUND

One type of haptic stimulation, which may be referred to as a tactile stimulation, stimulates receptors in human skin. Human skin has a number of different types of receptors, which are adapted for different tactile sensations. Meissner corpuscles in the skin are adapted to sense low frequency vibrations. Merkel cells in the skin are adapted to sense pressure. Ruffini endings in the skin are adapted to sense shear deformation. Pacinian corpuscles in the skin are adapted to sense high frequency vibrations.

SUMMARY

According to one aspect of the present disclosure, there is provided a haptic stimulation system comprising a haptic stimulation interface comprising a pattern of stimulation elements configured to stimulate receptors in skin of a user. The haptic stimulation system further comprises a control circuit configured to present information in the haptic stimulation interface in accordance with a presentation mode that is tailored to the user. Presenting information in a haptic stimulation interface in accordance with a presentation mode that is tailored to the user may allow a user to progressively learn to decipher more complex presentation modes in the haptic stimulation interface. Thus, a user with no experience with the haptic stimulation interface can immediately benefit. Moreover, the user can, at their own rate, progressively learn to decipher more complex presentation modes in the haptic stimulation interface. Furthermore, by being able to tailor the presentation mode to the user, the haptic stimulation interface may become more efficient at providing information to the user. Hence, embodiments provide a technical improvement in the operation of the haptic stimulation interface.

Optionally, in any of the preceding aspects, the control circuit is further configured to tailor the presentation mode to the user based on user input.

Optionally, in any of the preceding aspects, to present the information in the haptic stimulation interface in accordance with the presentation mode the control circuit is further configured to: map symbolic representations of letters to the pattern of stimulation elements in response to the presentation mode being a first mode; and map symbolic representations of words to the pattern of stimulation elements in response to the presentation mode being a second mode. Having options of different presentation modes allows the user to select a presentation mode that is more efficient at presenting information, which not only saves the user time but may save power and/or extend battery life in the haptic stimulation system.

Optionally, in any of the preceding aspects, to present the information in the haptic stimulation interface in accordance with the presentation mode the control circuit is further configured to: map visual waveform representations of sounds of letters to the pattern of stimulation elements in response to the presentation mode being a first mode; and map visual waveform representations of sounds of words to the pattern of stimulation elements in response to the presentation mode being a second mode.

Optionally, in any of the preceding aspects, to present the information in the haptic stimulation interface in accordance with the presentation mode the control circuit is further configured to: map symbolic representations of digital information to the pattern of stimulation elements in response to the presentation mode being a first mode; and map visual waveform representations of sounds of digital information to the pattern of stimulation elements in response to the presentation mode being a second mode.

Optionally, in any of the preceding aspects, to present the information in the haptic stimulation interface in accordance with the presentation mode the control circuit is further configured to: spatially map an image to the pattern of stimulation elements in response to the presentation mode being a first mode; and temporally map an image to groups of elements in the pattern of stimulation elements in response to the presentation mode being a second mode.

Optionally, in any of the preceding aspects, the haptic stimulation system further comprises a user interface configured to receive a user selection of a level of complexity of how the information is presented in the haptic stimulation interface. The control circuit is configured to select the presentation mode based on the level of complexity.

Optionally, in any of the preceding aspects, the control circuit is further configured to increase a level of complexity of how the information is presented in the haptic stimulation interface in response to the user adapting to the haptic stimulation interface.

Optionally, in any of the preceding aspects, the haptic stimulation system further comprises a wireless communication interface configured to receive information to be presented in the haptic stimulation interface. The control circuit is further configured to map digital data received on the wireless communication interface to the pattern of stimulation elements in order to present the information in the haptic stimulation interface.

Optionally, in any of the preceding aspects, the haptic stimulation system further comprises a wireless communication device. The wireless communication device is configured to provide the digital data to the wireless communication interface. Some users may be unable to take advantage of, for example, a visual display or an audio display of the wireless communication device. Embodiments solve a technical challenge by being able to allow information from the wireless communication device to be presented to the user.

Optionally, in any of the preceding aspects the haptic stimulation system further comprises a ring-shaped member configured to fit on a human finger. The ring-shaped member has an inner ring surface and an outer ring surface. A ring-shaped form factor solves technical challenges in how to effectively interface with the user's senses, while being a convenient form factor for the user. The ring-shaped form factor is not cumbersome, but rather is quite convenient for the user to wear.

Optionally, in any of the preceding aspects the pattern of stimulation elements is configured to stimulate the receptors in the skin via the inner ring surface. The ring-shaped member has an inner ring surface and an outer ring surface. Even if the inner ring surface has a limited surface contact with the user's skin, the information can be effectively transferred to the user due to the sensitivity of the skin receptors in the user's fingers.

Optionally, in any of the preceding aspects the pattern of stimulation elements is configured to stimulate the receptors in the skin via the outer ring surface.

Optionally, in any of the preceding aspects the pattern of stimulation elements comprises a pattern of electrodes configured to stimulate the receptors in the skin.

Optionally, in any of the preceding aspects the pattern of stimulation elements comprises a pattern of electromechanical transducers configured to stimulate the receptors in the skin through mechanical vibration of each of the electromechanical transducers.

Optionally, in any of the preceding aspects the pattern of stimulation elements comprises a pattern of electroacoustic transducers configured to stimulate the receptors in the skin through mechanical vibration of the electroacoustic transducers.

Optionally, in any of the preceding aspects the pattern of stimulation elements comprises a pattern of electrothermal transducers configured to stimulate the receptors in the skin through temperature of each of the electrothermal transducers.

Optionally, in any of the preceding aspects the haptic stimulation system further comprises a member configured to fit around a human wrist.

Optionally, in any of the preceding aspects the haptic stimulation system further comprises a member configured to fit around a human neck.

Optionally, in any of the preceding aspects the pattern of stimulation elements resides in a surface that is substantially planar.

Optionally, in any of the preceding aspects the pattern of stimulation elements resides in a curved surface.

Optionally, in any of the preceding aspects the information comprises text. Also, the control circuit is further configured to represent the text in a shape that physically maps to the text in order to tailor the presentation mode to the user.

Optionally, in any of the preceding aspects the information comprises sound. Also, the control circuit is further configured to convert the sound into a visual representation of the sound in order to tailor the presentation mode to the user. Also, the control circuit is further configured to present the visual representation of the sound in the haptic stimulation interface.

According to one other aspect of the present disclosure, there is provided method for haptic presentation of information to a user. The method comprises tailoring a presentation mode to a user of a haptic stimulation interface comprising a pattern of stimulation elements; and stimulating receptors in skin of the user with the pattern of stimulation elements in order to present the information in accordance with the presentation mode.

According to still one other aspect of the present disclosure, there is provided a non-transitory computer-readable medium storing computer readable instructions for providing haptic communication, that when executed by one or more processors, cause the one or more processors to: access information to be presented in a haptic stimulation interface comprising a pattern of stimulation elements configured to stimulate receptors in skin of a user; tailor a presentation mode to the user; and cause information to be presented in the haptic stimulation interface in accordance with the presentation mode.

According to still one other aspect of the present disclosure, there is provided a wireless communication device, comprising: a non-transitory memory storage comprising instructions; and one or more processors in communication with the non-transitory memory storage, wherein the one or more processors execute the instructions to: access information to be presented in a haptic stimulation interface comprising a pattern of stimulation elements configured to stimulate receptors in skin of a user; and cause the information to be presented in the haptic stimulation interface in accordance with a presentation mode that is tailored to the user.

According to still one other aspect of the present disclosure, there is provided a haptic stimulation device, comprising: a haptic stimulation interface comprising a pattern of stimulation elements configured to stimulate receptors in skin of a user; and a receiver configured to receive information to present in the haptic stimulation interface.

Optionally, in any of the preceding aspects, the haptic stimulation device further comprises a controller configured to output a digital signal based on the received information; and a digital to analog converter configured to convert the digital signal to an analog signal to drive the pattern of stimulation elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
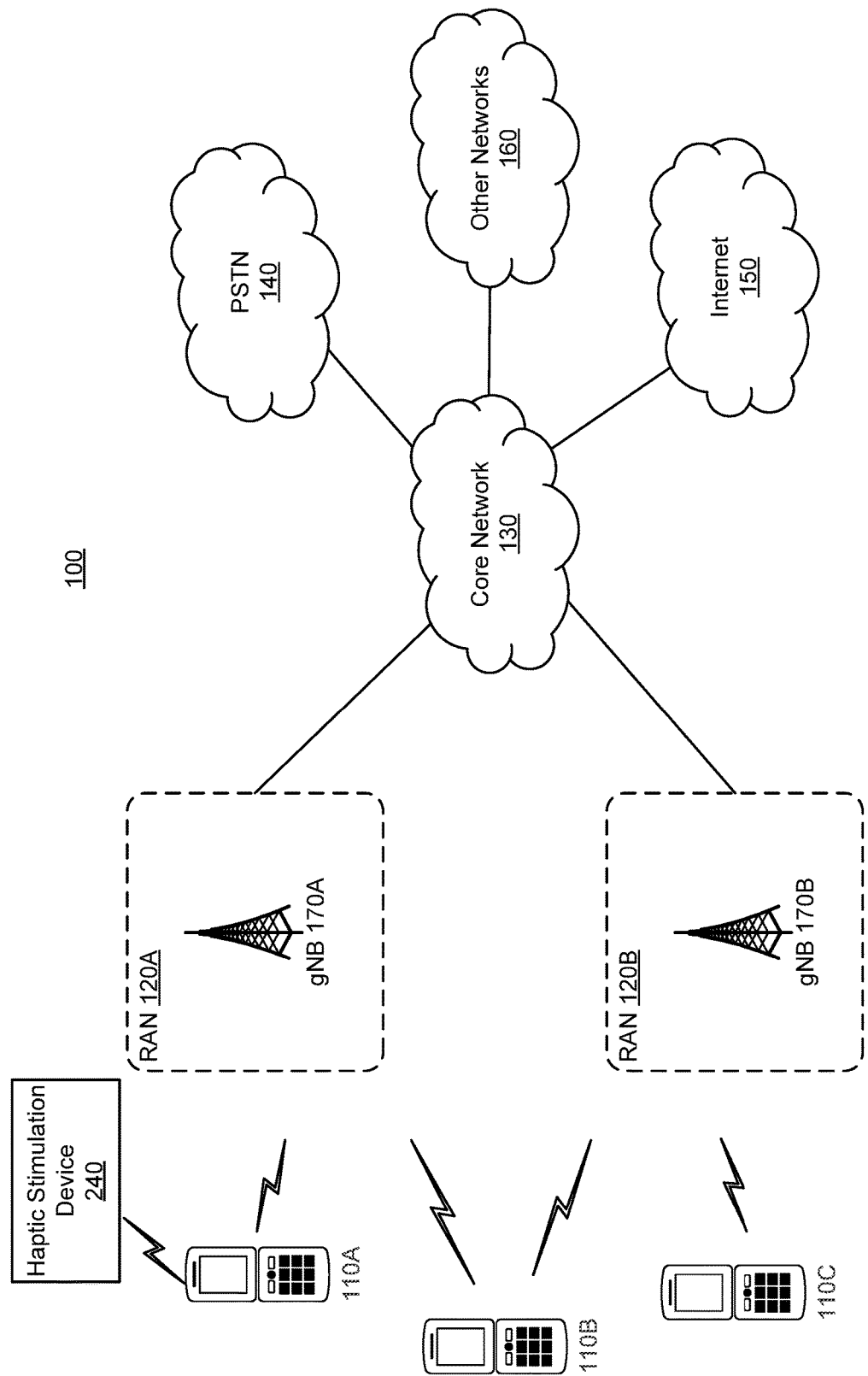
FIG. 1 illustrates a wireless network for communicating data.

The present disclosure will now be described with reference to the figures, which in general relate to haptic stimulation systems and methods.

One challenge in providing a viable haptic stimulation system is due to a lack of neuroscientific understanding of how the human brain will adapt to learning to use the haptic stimulation system. For example, it can be difficult to predict the best presentation mode in which to present information in a haptic stimulation interface in the system. Moreover, the best presentation mode may vary considerably from one person to the next. Presenting the information in a simple presentation mode makes it easier for the person to decipher the information. An example of a very simple presentation mode is a binary notification, such as a buzz that is other on or off. However, a simple presentation mode has limitations on the amount and/or quality of information that can be presented. For example, a binary notification might be used to inform the user that a message has been received, but does not indicate anything about the content of the message. On the end of the spectrum, a complex presentation mode can be used to convey more information. For example, the haptic stimulation interface might be used to present one word at a time, such that the user could read through the message. An example of presenting one word at a time is to determine a visual waveform representation of the sound of the word, and then map the visual waveform representation to the haptic stimulation interface. However, the person might have a difficult time deciphering the more complex presentation in the haptic stimulation interface. Selecting the proper presentation mode may depend greatly on the person using the haptic stimulation interface. Selecting the proper presentation mode may depend greatly on the experience level of the person with the haptic stimulation interface.

Techniques provided herein present information in a haptic stimulation interface in accordance with a presentation mode that is tailored to the user. Tailoring the presentation mode to the user provides a viable way to allow the user to adapt to the haptic stimulation interface. In one embodiment, the haptic stimulation interface uses tactile stimulation to stimulate receptors in human skin. The presentation mode refers to a mode or manner in which the information is presented in the haptic stimulation interface. Examples of presentation modes include, but are not limited to: symbolic representations of letters, symbolic representations of words, visual waveform representations of sounds of letters, visual waveform representations of sounds of words, a spatial representation of an image, and a temporal representation of an image. Presenting information in a haptic stimulation interface in accordance with a presentation mode that is tailored to the user may allow a user to progressively learn to decipher more complex presentation modes in the haptic stimulation interface. Thus, a user with no experience with the haptic stimulation interface can immediately benefit. Moreover, the user can, at their own rate, progressively learn to decipher more complex presentation modes in the haptic stimulation interface. Furthermore, by being able to tailor the presentation mode to the user, the haptic stimulation interface may actually become more efficient at providing information to the user. Hence, embodiments provide a technical improvement in the operation of the haptic stimulation interface.

In one embodiment, a haptic stimulation device is paired with a wireless communication device, such as a cellular telephone. The haptic stimulation device may be used to present information from the wireless communication device. The wireless communication device provides digital information to the haptic stimulation device, in one embodiment. A wireless communication device typically has a screen for visual information, a speaker (or earphone jack) for audio information. Some wireless communication devices may be configured to vibrate when, for example, a phone call is received. However, providing a viable haptic stimulation system to present textual, visual and/or audio information from a wireless communication device (or other source of information to be presented in the haptic stimulation interface) is challenging. Moreover, some users may be unable to take advantage of the visual display or the audio display of the wireless communication device. Thus, embodiments solve a technical challenge by being able to allow information from a wireless communication device to be presented to the user.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g., 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as a UE 110, or collectively as the UEs 110, are configured to operate and/or communicate in the system 100. For example, a UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 Gigahertz (GHz) to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

In one embodiment, a UE 110 has a wireless connection to a haptic stimulation device 240. The UE 110 sends information (e.g., digital data) to the haptic stimulation device 240 over the wireless connection, in one embodiment. The information is presented in haptic stimulation interface 250 in accordance with a presentation mode that is tailored to a user of the UE 110. Tailoring the presentation mode to the user provides a viable way to allow the user to adapt to the haptic stimulation device 240. In one embodiment, a haptic stimulation system comprises the haptic stimulation device 240 and the UE 110. In one embodiment, a haptic stimulation system comprises the haptic stimulation device 240 but does not include the UE 110.

Figure 2:
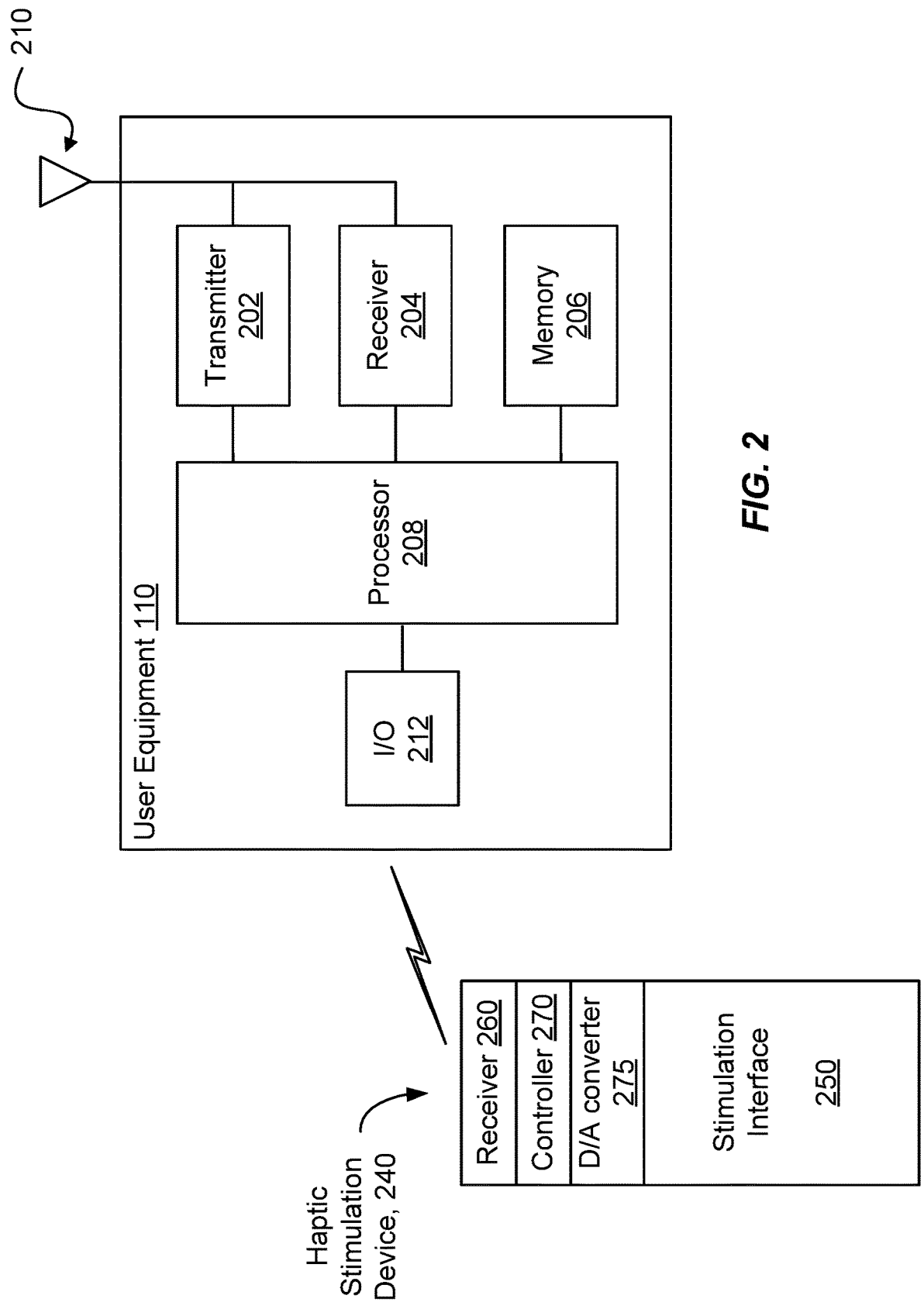
FIG. 2 illustrates one embodiment of a haptic stimulation system.

FIG. 2 illustrates one embodiment of a haptic stimulation system. The haptic stimulation system comprises a haptic stimulation device 240 and the UE 110, in this embodiment. The haptic stimulation system comprises the haptic stimulation device 240 but does not include the UE 110, in another embodiment. The UE 110 may for example be a mobile telephone, but may be other devices in further examples such as a desktop computer, laptop computer, tablet, hand-held computing device, automobile computing device and/or other computing devices. As shown in the figure, the exemplary UE 110 is shown as including at least one transmitter 202, at least one receiver 204, memory 206, at least one processor 208, and at least one input/output (I/O) device 212. The processor 208 can implement various processing operations of the UE 110. For example, the processor 208 can perform signal coding, data processing, power control, input/output processing, or any other functionality enabling the UE 110 to operate in the system 100 (FIG. 1). The processor 208 may include any suitable processing or computing device configured to perform one or more operations. For example, the processor 208 may include a microprocessor, microcontroller, digital signal processor, field programmable gate array, or application specific integrated circuit. The memory 206 is non-transitory memory storage, in one embodiment. The memory 206 is a non-transitory computer readable medium, in one embodiment.

The transmitter 202 can be configured to modulate data or other content for transmission by at least one antenna 210. The transmitter 202 can also be configured to amplify, filter and a frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter and frequency convert RF signals received via the antenna 210. The receiver 204 is an RF signal receiver, in some embodiments. The receiver 204 can include any suitable structure for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown. At least one of the transmitters 202 is configured to communication with the haptic stimulation device 240, in one embodiment. At least one of the receivers 204 is configured to communicate with the haptic stimulation device 240, in one embodiment. Such a transmitter and/or receiver comprises a wireless communication interface configured to communicate with the haptic stimulation device 240, in one embodiment.

The UE 110 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen. Note that some users may have a difficult time using one or more of the structures for receiving information. For example, some users may have a difficult time seeing or reading a visual display on the UE 110. As another example, some users may have a difficult time hearing a speaker on the UE 110. Embodiments of a haptic stimulation device 240 allow a user to obtain such information from the UE 110.

In addition, the UE 110 includes at least one memory 206. The memory 206 stores instructions and data used, generated, or collected by the UE 110. For example, the memory 206 could store software or firmware instructions executed by the processor(s) 208 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The UE 110 has a wireless connection to the haptic stimulation device 240. The haptic stimulation device 240 has a haptic stimulation interface 250 (also referred to more briefly as a "stimulation interface"), a receiver 260, a controller 270, and a digital-to-analog (D/A) converter 275. The receiver 260 may comprise a wireless receiver configured to communicate wirelessly with the UE 110. The receiver 260 may be configured to communicate using a variety of wireless communication protocols including, but not limited to, an IEEE (Institute of Electrical and Electronics Engineers) 802.11 protocol or an IEEE 802.15 protocol. In one embodiment, the receiver 260 is configured to communicate using Bluetooth®. Optionally, the haptic stimulation device 240 may have a transmitter, which may be configured to communicate using a variety of wireless communication protocols. In one embodiment, the user is allowed to select what information gets transferred from the UE 110 to the haptic stimulation device 240. As the user becomes more comfortable with the haptic stimulation device 240 the user might request that more detailed information be sent. For example, the user might select to have a notification that an email has been received, key words from the email, the entire email, etc.

The stimulation interface 250 is configured to stimulate receptors in human skin, in one embodiment. The receptors may include, but are not limited to, Meissner corpuscles, Merkel cells, Ruffini endings, and Pacinian corpuscles. The stimulation interface 250 is not required to stimulate all of these types of receptors. In one embodiment, the stimulation interface 250 stimulates a subset of one or more types of receptors (e.g., Meissner corpuscles, Merkel cells, Ruffini endings, and/or Pacinian corpuscles). The stimulation interface 250 has a pattern of stimulation elements, in one embodiment. The stimulation interface 250 may use electrical signals (e.g., voltage, current, etc.), temperature (e.g., cold, heat), and/or mechanical motion (e.g., mechanical vibration) in order to stimulate receptors in human skin, but is not limited to these techniques to stimulate receptors in human skin. The user may learn to decipher the stimulation of the receptors in their skin in order to obtain information. For example, the user may use the haptic stimulation device 240 to "read" an email message that was received at the UE 110. Here, the term "read" appears in quotes to emphasize that this is not a typical situation in which a user visually reads from, for example, a display screen on the UE 110.

The controller 270 is configured to control operations of the haptic stimulation device 240. The controller 270 is configured to control transfer of data from the UE 110 by way of the receiver 260, in one embodiment. Data transfer is unidirectional, from the UE 110 to the haptic stimulation device 240, in one embodiment. Data transfer is bi-directional, in one embodiment. Therefore, the haptic stimulation device 240 may report configuration information, status, etc. to the UE 110.

The controller 270 is configured to control the presentation of the data in the stimulation interface 250, in one embodiment. In one embodiment, this includes selecting a presentation mode. The D/A converter 275 is configured to convert a digital signal to an analog signal. In one embodiment, the controller 270 processes a first digital signal from the UE 110 and provides a second digital signal to the D/A converter 275. Based on the second digital signal from the controller 270, the D/A converter 275 outputs an analog signal to drive the stimulation interface 250. The first and second digital signals may be different as the controller 270 may handle functions such as selecting the presentation mode and/or generating a suitable digital signal for the configuration of the stimulation interface 250. In one embodiment, the UE 110 handles these functions, wherein the first and second digital signals may be the same.

The controller 270 may be implemented in hardware, software, or a combination of hardware and software. Hardware control circuit components for implementing the controller 270 may include, but are not limited to, Field-programmable Gate Arrays (FPGAs), Application-specific Integrated Circuits (ASICs), Application-specific Standard Products (ASSPs), System-on-a-chip systems (SOCs), Complex Programmable Control Circuit Devices (CPLDs), special purpose computers, etc. In one embodiment, the controller 270 is implemented with software (stored on a storage device) used to program one or more processors. Thus, the controller 270 may comprise a storage device and a processor.

The controller 270 is one embodiment of a control circuit configured to present information in the haptic stimulation interface 250 in accordance with a presentation mode that is tailored to the user. The controller 270 works together with the UE 110 to present information on the stimulation interface 250, in one embodiment. For example, by executing instructions stored in the memory 206 on the processor 208, the UE 110 may select a presentation mode, and send digital data to the receiver 260. Thus, in one embodiment, the combination of the controller 270, processor 208, and memory 206 may be referred to as a control circuit configured to present information in the haptic stimulation interface 250 in accordance with a presentation mode that is tailored to the user.

In some embodiments the haptic stimulation device 240 is battery powered. Also, in some embodiments the UE 110 is battery powered. Some presentation modes may be more efficient at presenting information to the user, as will be pointed out below. Presentation modes that are more efficient at presenting information to the user may save power consumed by the haptic stimulation device 240 and/or the UE 110. Therefore, presentation modes that are more efficient at presenting information to the user may extend the battery life of the haptic stimulation device 240 and/or the UE 110.

Figure 3:
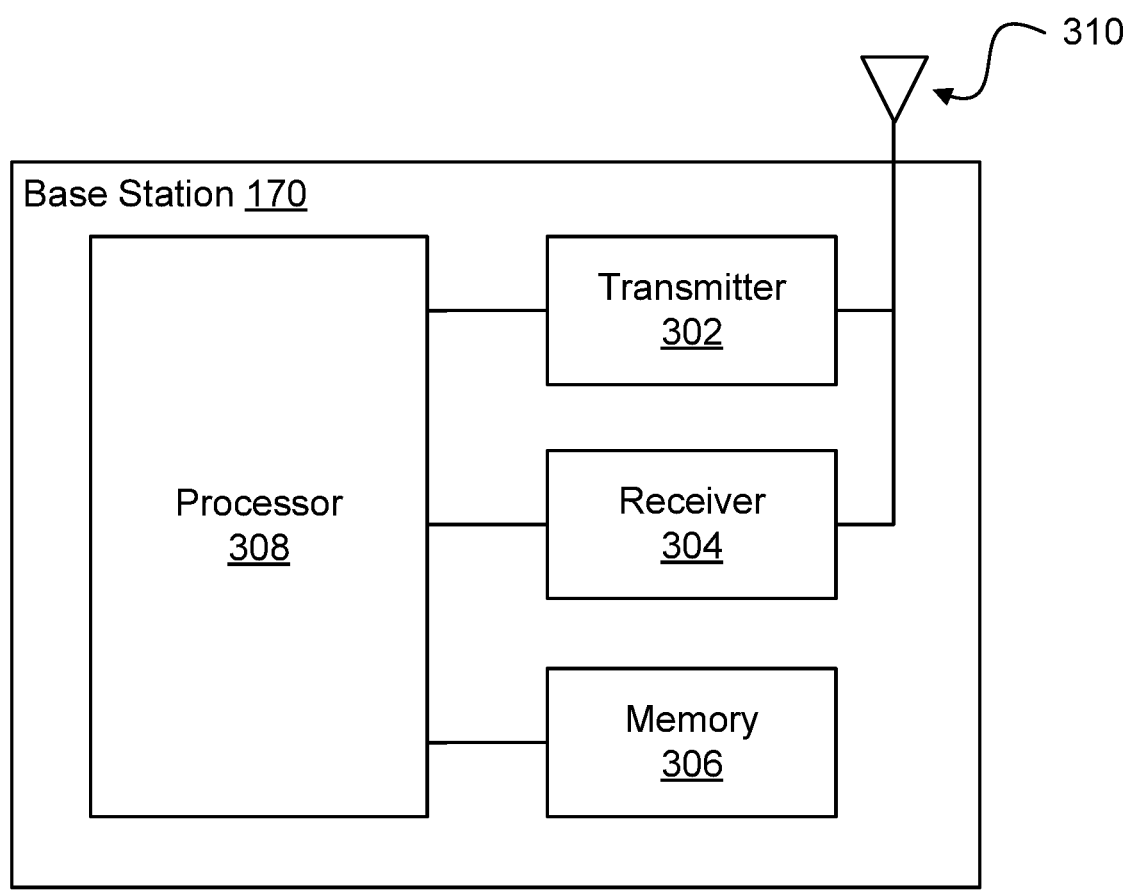
FIG. 3 illustrates an example Base Station.

FIG. 3 illustrates an example BS 170 that may implement the methods and teachings according to this disclosure. As shown in the figure, the BS 170 includes at least one processor 308, at least one transmitter 302, at least one receiver 304, one or more antennas 310, and at least one memory 306. The processor 308 implements various processing operations of the BS 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit. The memory 306 is non-transitory memory storage, in one embodiment.

Each transmitter 302 includes any suitable structure for generating signals for wireless transmission to one or more UEs 110 or other devices. Each receiver 304 includes any suitable structure for processing signals received wirelessly from one or more UEs 110 or other devices. Although shown as separate blocks or components, at least one transmitter 302 and at least one receiver 304 could be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

Figure 4:
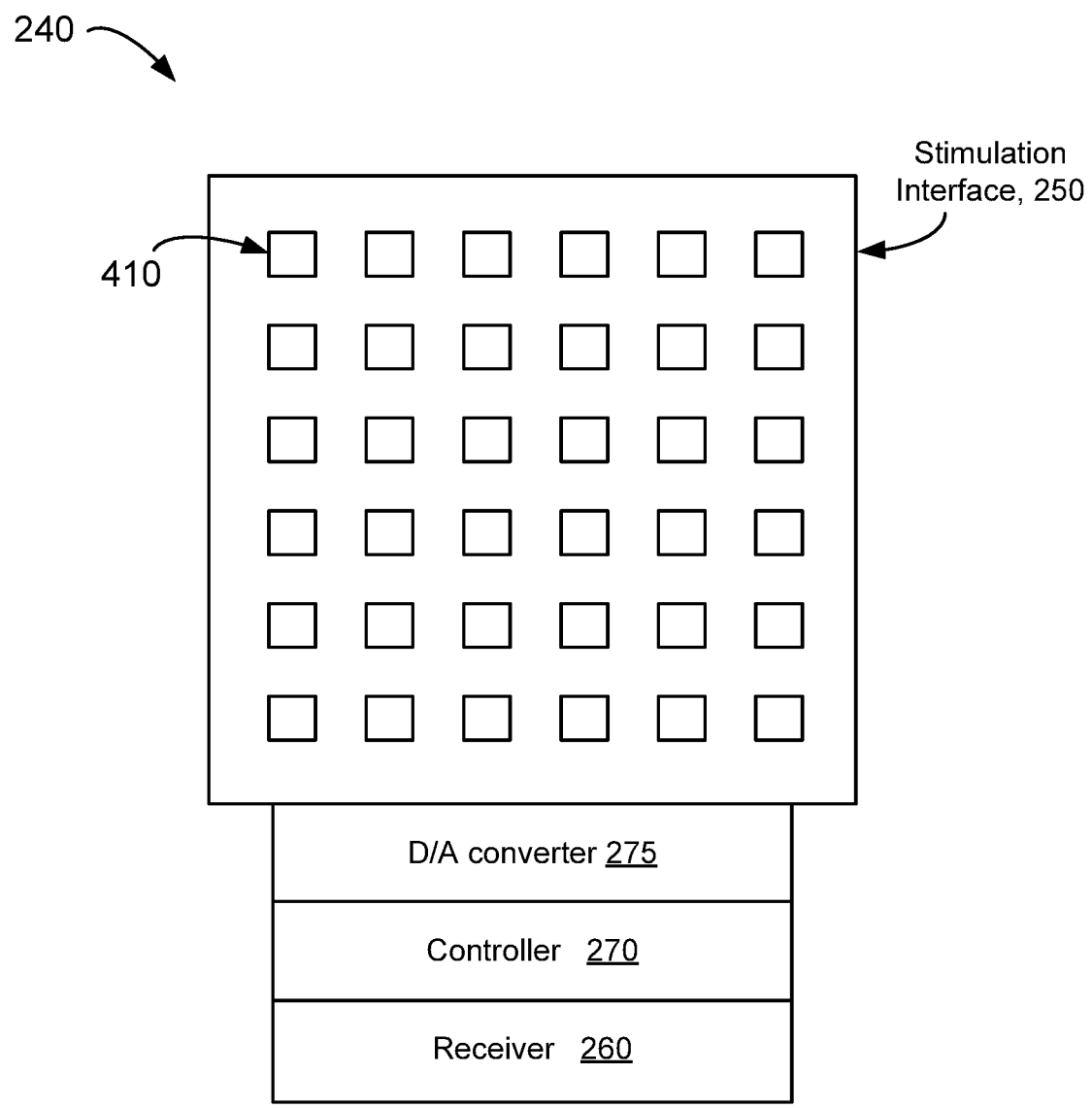
FIG. 4 depicts one embodiment of a haptic stimulation device.

FIG. 4 depicts one embodiment of a haptic stimulation device 240. The stimulation interface 250 has a pattern of haptic stimulation elements 410 (also referred to more briefly as "stimulation elements"). The pattern of stimulation elements 410 are used to stimulate receptors (e.g., Meissner corpuscles, Merkel cells, Ruffini endings, and/or Pacinian corpuscles) in human skin, in one embodiment. Each stimulation element 410 may be independently controlled, in one embodiment. The pattern in FIG. 4 is just one example, but many other configurations of the stimulation elements 410 is possible. In this example, there is a six by six pattern of stimulation elements 410, for a total of 36 stimulation elements 410. The number of stimulation elements 410 can vary with implementation. There are six rows of stimulation elements 410 and six columns of stimulation elements 410 in the example in FIG. 4. It is not required that number of rows is equal to the number of rows. The stimulation elements 410 are spaced apart equally in the example in FIG. 4; however, equal spacing is not required. It is not required that the pattern be arranged in rows and columns. In one embodiment, the pattern comprises an array of stimulation elements 410. The term "array" is being used to refer to a systematic arrangement of similar objects such as stimulation elements 410.

The cross-sectional shape of each stimulation element 410 is depicted as a square in FIG. 4, but the stimulation elements 410 may have other cross-sectional shapes.

In one embodiment, each stimulation element 410 comprises an electrode, which may be biased to a desired voltage. Thus, the stimulation interface 250 comprises a pattern of electrodes configured to stimulate receptors in the user's skin, in one embodiment. In one embodiment, some of the stimulation elements 410 are referred to as activation electrodes, and other stimulation elements 410 are referred to as ground electrodes. There are one or more ground electrodes, in one embodiment. By biasing an activation electrode to a suitable voltage with the ground electrode(s)

at a common voltage, a current may be made to flow through the user's skin from the activation electrode to one or more ground electrodes. The current that flows through the user's skin may be an ionic current. An activation electrode may be biased to the common voltage, in one embodiment, if it is desired to not activate that particular activation electrode.

In one embodiment, each stimulation element 410 comprises an electromechanical transducer. Thus, the stimulation interface 250 comprises a pattern of electromechanical transducers configured to stimulate receptors in the user's skin, in one embodiment. An electromechanical transducer is capable of converting electrical energy into mechanical energy. The mechanical energy may be in the form of mechanical vibration. For example, an electromechanical transducer may be controlled by an electrical signal (e.g., current or voltage) to cause mechanical vibration of the stimulation element 410. A pattern of stimulation elements 410 comprising electromechanical transducers is used to stimulate receptors in human skin by mechanical vibration of the electromechanical transducers, in one embodiment.

In one embodiment, each stimulation element 410 comprises an electroacoustic transducer. Thus, the stimulation interface 250 comprises a pattern of electroacoustic transducers configured to stimulate receptors in the user's skin, in one embodiment. An electroacoustic transducer is capable of converting electrical energy into acoustic energy. The acoustic energy may be in the form of a sound wave. For example, an electroacoustic transducer may be controlled by an electrical signal (e.g., current or voltage) to generate a sound wave. In one embodiment, each electroacoustic transducer comprises an audio speaker. A pattern of stimulation elements 410 comprising electroacoustic transducers is used to stimulate receptors in human skin by mechanical vibration of the electroacoustic transducers, in one embodiment.

An electroacoustic transducer could be between about 0.5 millimeter (mm) to 2 mm in diameter. However, electroacoustic transducers smaller than 0.5 mm or larger than 2 mm may also be used for stimulation elements 410. In one embodiment, the electroacoustic transducers are driven to create sound waves in a frequency range between 10 Hertz (Hz) to 10 kHz. However, the electroacoustic transducers could be driven to create sound waves below 10 Hz or greater than 10 kHz.

In one embodiment, each stimulation element 410 comprises an electrothermal transducer. Thus, the stimulation interface 250 comprises a pattern of electrothermal transducers configured to stimulate receptors in the user's skin, in one embodiment. An electrothermal transducer is capable of converting electrical energy into thermal energy. For example, an electrothermal transducer may be controlled by an electrical signal (e.g., current or voltage) to generate thermal energy. In one embodiment, each electrothermal transducer comprises a resistor. In one embodiment, each electrothermal transducer comprises a diode. A pattern of stimulation elements 410 comprising electrothermal transducers is used to stimulate receptors in human skin by relative temperature of the electrothermal transducers, in one embodiment.

In one embodiment, a single stimulation element 410 by itself may stimulate receptors in the human skin. For example, each stimulation element may comprise an electromechanical transducer that is controlled by an electrical signal (e.g., current or voltage) to generate mechanical vibration. In one embodiment, two or more stimulation elements 410 work together to stimulate receptors in the human skin. For example, each stimulation element may comprise an electrode such that a current flows from the point of contact of the user's skin with an activation electrode, through the user's skin, and to a point of contact of the user's skin with a ground electrode. Note that the current being referred to within the user's skin is ionic current, in one embodiment.

The stimulation elements 410 can be controlled in a variety of presentation modes to present the information. Presenting information in a haptic stimulation interface in accordance with a presentation mode that is tailored to the user may allow a user to progressively learn to decipher more complex presentation modes in the haptic stimulation interface. Thus, a user with no experience with the haptic stimulation interface can immediately benefit. Moreover, the user can, at their own rate, progressively learn to decipher more complex presentation modes in the haptic stimulation interface.

One presentation mode is referred to herein as a "spatial representation." In one embodiment of a spatial representation the entire pattern of stimulation elements 410 may be used at the same time, with some elements active and some inactive. One presentation mode is referred to herein as a "temporal representation." In one embodiment of a temporal representation one column of stimulation elements 410 may be used at a first point in time, with some simulation elements 410 active and some inactive in that column. All other columns may be inactive at the first point in time. At a second point in time, a second column of the pattern of stimulation elements 410 may be used in a similar manner. The temporal representation may continue for other sequential points in time for other columns of the pattern of stimulation elements 410. Another embodiment of a temporal representation rolls through rows of the pattern of stimulation elements 410 in a similar manner.

The format of the information provided by the UE 110 to the haptic stimulation device 240 may vary depending on the implementation. For example, the information may be "raw data," such as text data or even image data. In this case, the haptic stimulation device 240 is configured to determine how to map the "raw data" to the pattern of haptic stimulation elements 410. However, the UE 110 may provide the information in a more refined format. For example, the UE 110 may have knowledge of the configuration of the pattern of stimulation elements 410. In this case, the UE 110 may instruct the haptic stimulation device 240 what should be presented in each of the stimulation elements 410.

Figure 5:
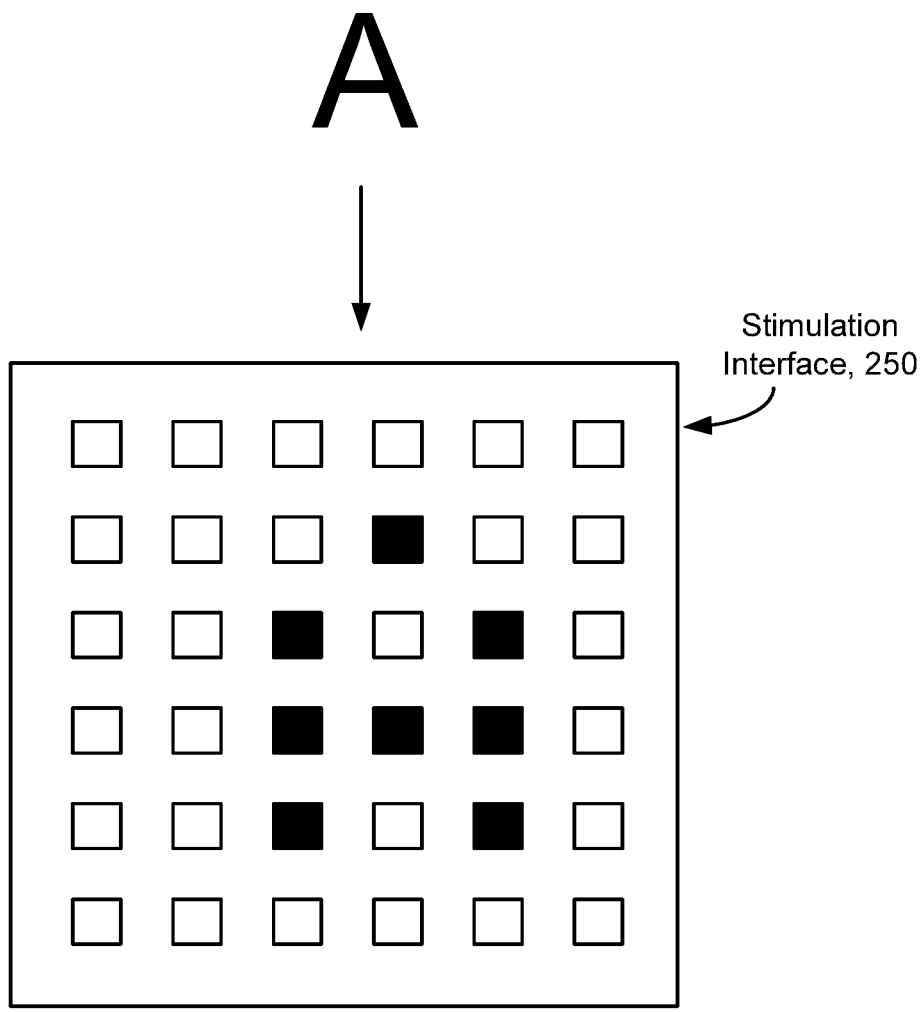
FIG. 5 depicts an embodiment of presenting information in a haptic stimulation interface in a presentation mode referred to herein as "symbolic representations of letters."

FIG. 5 depicts an embodiment of presenting information in a haptic stimulation interface 250 in a presentation mode referred to herein as "symbolic representations of letters." The letter "A" from the English alphabet is being represented on the haptic stimulation interface 250. In this example, the representation in the haptic stimulation interface 250 has a visual appearance of the letter "A" from the English alphabet. This concept may be applied to alphabets of other languages.

Figure 6:
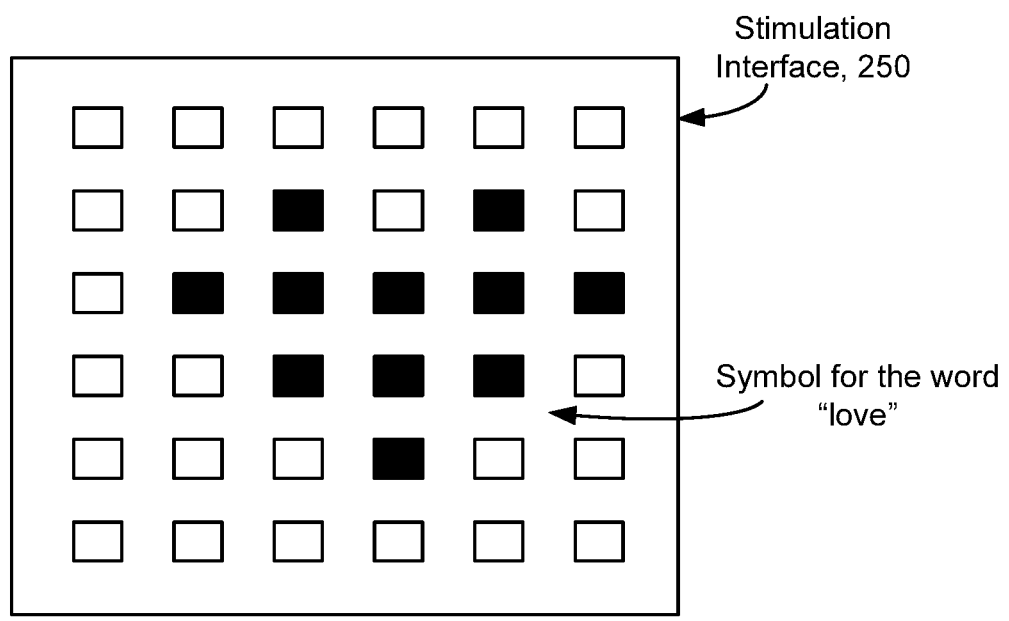
FIG. 6 depicts an embodiment of presenting information in a haptic stimulation interface in a presentation mode referred to herein as "symbolic representations of words."

FIG. 6 depicts an embodiment of presenting information in a haptic stimulation interface 250 in a presentation mode referred to herein as "symbolic representations of words." The word "love" from the English alphabet is being represented on the haptic stimulation interface 250. In this example, the representation in the haptic stimulation interface 250 has a visual appearance of the symbol of a heart, which in this example is a symbolic representation of the word "love." Note that being able to present an entire word, as opposed to a single letter, in the haptic stimulation interface 250 allows haptic stimulation interface 250 to be more efficient at presenting information to the user. For example, it can take far less time to present an email to the user. However, in some cases, the user is unable to interpret the more complex words. In other words, the user may be better able to interpret letters of an alphabet. Embodiments allow the user to select the presentation mode, which allows the user to decide what mode is best for this particular user. Moreover, note that taking less time in certain presentation modes not only saves the user's time, but can extend battery in the UE 110 and/or the haptic stimulation device 240.

The concepts of FIGS. 5 and 6 may be applied to characters or symbols for writing in other languages. Thus, one embodiment comprises a presentation mode referred to herein as a "symbolic representation of characters for writing in a language." For example, in one embodiment, the presentation mode is symbolic representations of Chinese characters. Here, Chinese characters refers to any of the known characters that have been developed to write a Chinese language.

Figure 7:
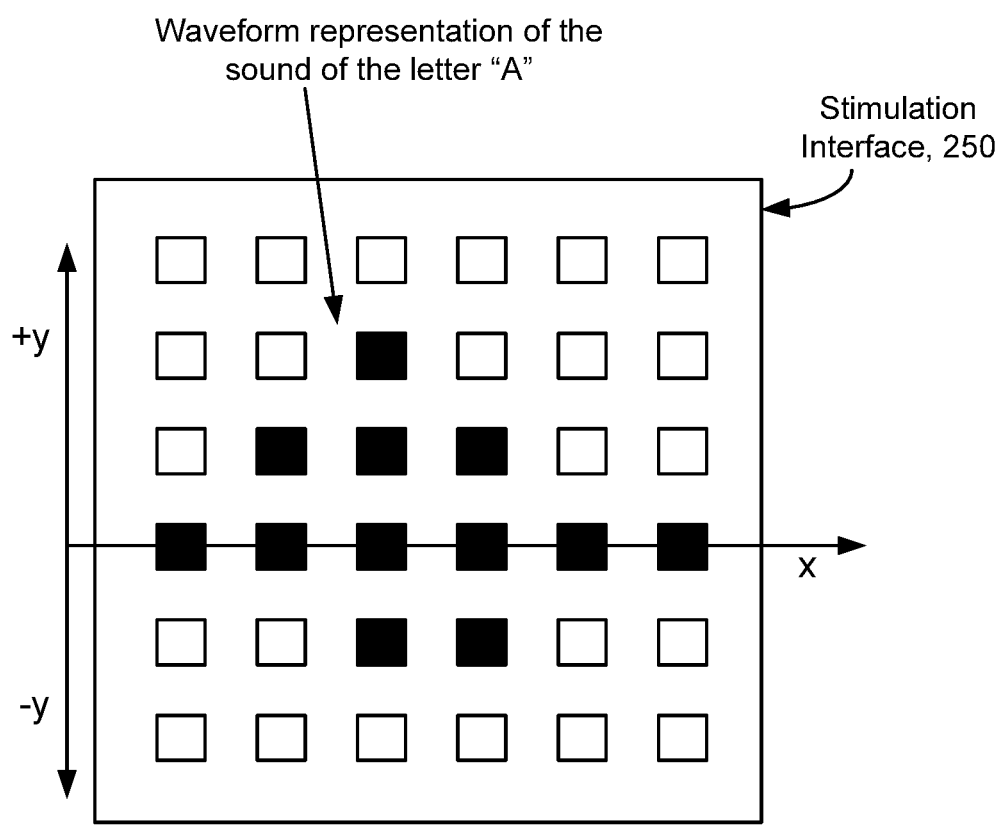
FIG. 7 depicts an embodiment of presenting information in a haptic stimulation interface in a presentation mode referred to herein as "visual waveform representations of sounds of letters."

FIG. 7 depicts an embodiment of presenting information in a haptic stimulation interface 250 in a presentation mode referred to herein as "visual waveform representations of sounds of letters." The sound waveform of a spoken letter can be visually represented as a "visual sound waveform." The visual sound waveform can be depicted as sound intensity versus time, as one example. Each letter of, for example, the English alphabet has a unique shape of the visual waveform representation of the sound. An x-y axis has been depicted in FIG. 7 to show how the visual waveform representation of the sound can be mapped to the haptic stimulation interface 250. The y-axis corresponds to sound intensity, and the x-axis corresponds to time. In one embodiment, the entire visual waveform representation of the sound is presented in the haptic stimulation interface 250 at the same time. In one embodiment, the visual waveform representation of the sound is progressively presented over time in the x-direction on the haptic stimulation interface 250.

Figure 8:
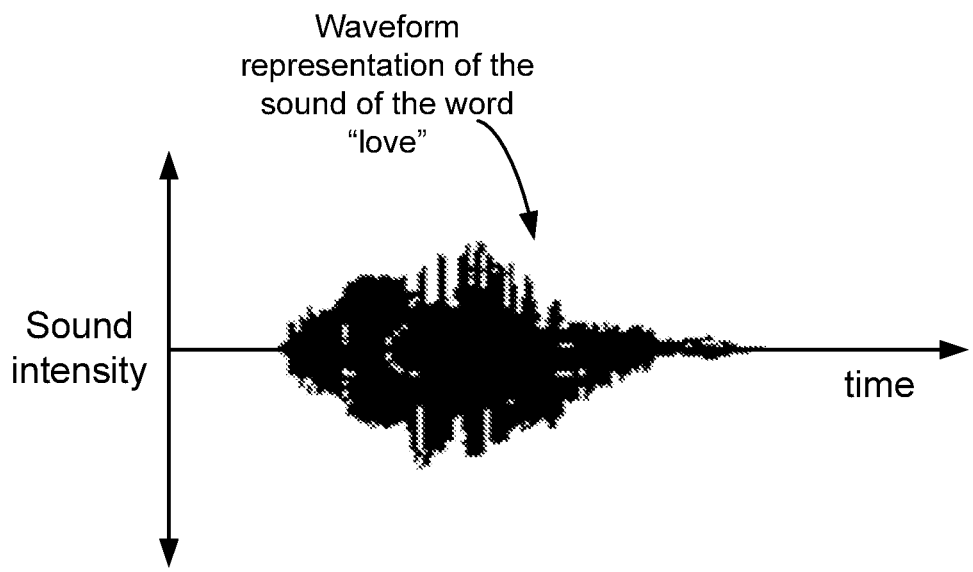
FIG. 8 depicts an embodiment of a presentation mode of presenting information in a haptic stimulation interface.
Figure 8:
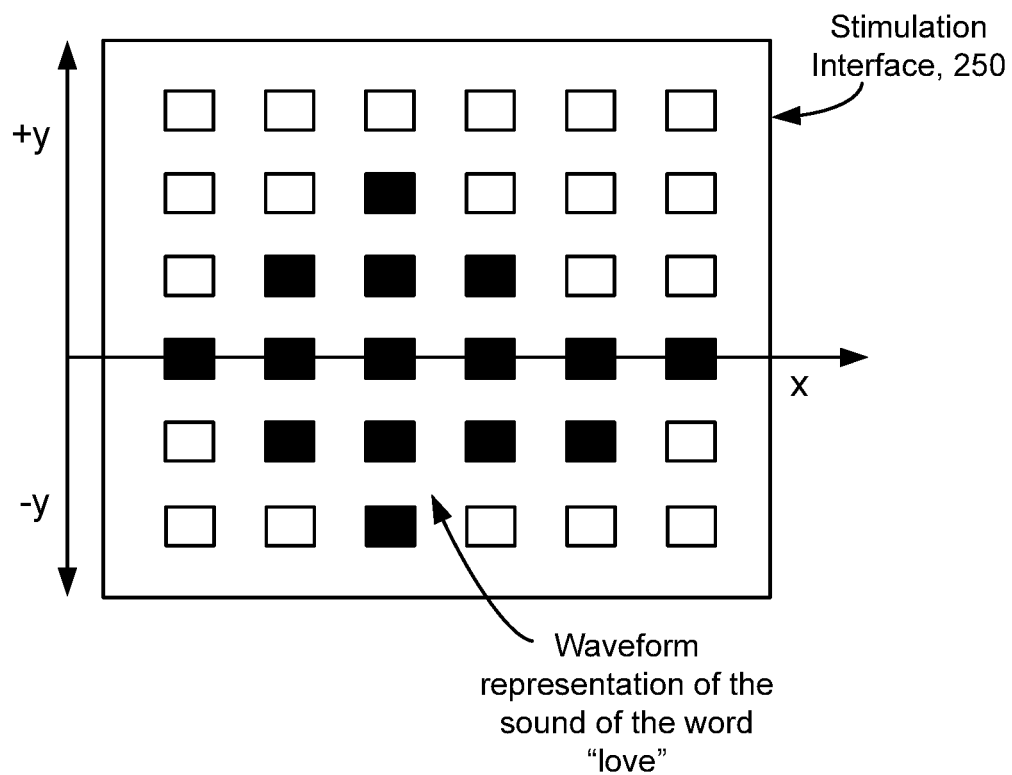

FIG. 8 depicts an embodiment of a presentation mode of presenting information in a haptic stimulation interface 250. The presentation mode is referred to herein as "visual waveform representations of sounds of words." The sound of a spoken word can be visually represented as a "visual sound waveform." The visual sound waveform can be depicted as sound intensity versus time, as one example. Different words of, for example, the English language have unique shapes of the visual sound waveform. An x-y axis has been depicted in FIG. 8 to show how the visual sound waveform can be mapped to the haptic stimulation interface 250. The y-axis corresponds to sound intensity, and the x-axis corresponds to time. In one embodiment, the entire visual sound waveform is presented in the haptic stimulation interface 250 at the same time. In one embodiment, the visual sound waveform is progressively presented over time in the x-direction on the haptic stimulation interface 250.

Similar to the examples of FIGS. 5 and 6, the embodiments of FIGS. 7 and 8 allow the user to select the presentation mode, which allows the user to decide what mode is best for this particular user. For example, being able to present an entire word (as in FIG. 8), as opposed to a single letter (as in FIG. 7), in the haptic stimulation interface 250 allows haptic stimulation interface 250 to be more efficient at presenting information to the user. For example, it can take far less time to present an email to the user. However, in some cases, the user may be unable to interpret the visual waveform representation of sounds of words (as in FIG. 8), due to there being many more possible words. In other words, the user may be better able to interpret visual waveform representation of sounds of letters of an alphabet. Embodiments allow the user to select the presentation mode, which allows the user to decide what mode is best for this particular user. Moreover, note that taking less time in certain presentation modes not only saves the user's times, but can extend battery in the UE 110 and/or the haptic stimulation device 240.

Figure 9:
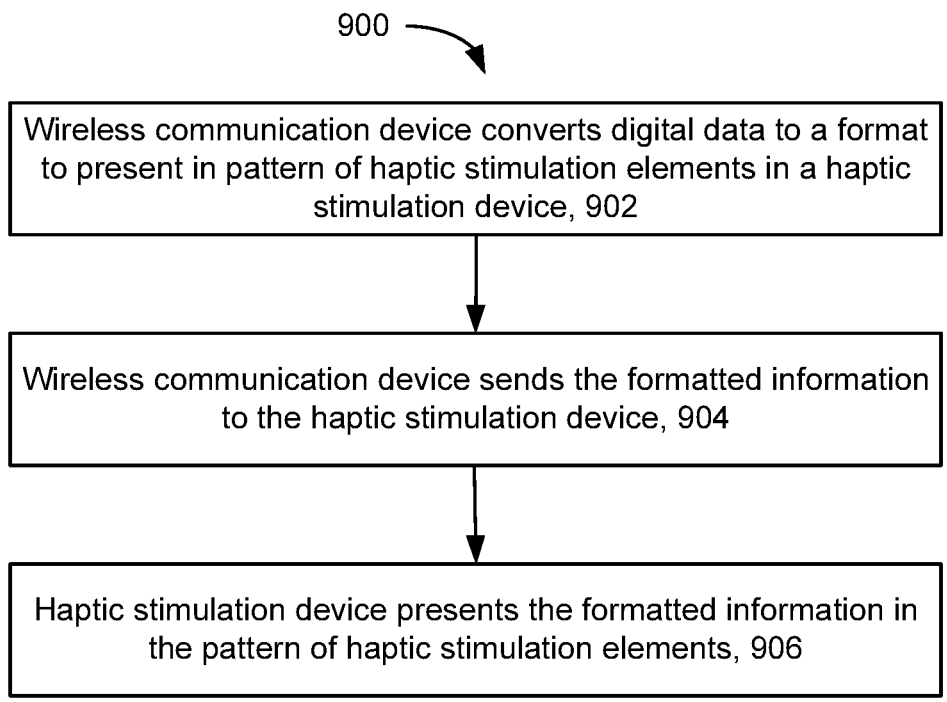
FIG. 9 is a flowchart of one embodiment of a process of presenting information in a haptic stimulation interface.

FIG. 9 is a flowchart of one embodiment of a process 900 of presenting information in a haptic stimulation interface 250. The process 900 may be used for haptic presentation of information to a user. Stated another way, the process 900 may be used for haptic communication of information to a user. The information is any digital data on the UE 110, in one embodiment. For example, the information could be textual context, image content, and/or audio content, but is not limited thereto. In process 900, the UE 110 provides the information to the haptic stimulation device 240 is a refined format that is ready to be presented in the pattern of haptic stimulation elements 410.

Step 902 includes a UE 110 converting digital data to a format to present in a pattern of haptic stimulation elements 410 in a haptic stimulation device 240. The format depends on the configuration of the pattern of stimulation elements 410. Converting the digital data to the format may be needed to accommodate the configuration of the pattern of haptic stimulation elements 410. For example, the digital data might be text data, wherein the UE 110 may determine which haptic stimulation elements 410 should be activated to present a certain character (text) in the haptic stimulation elements 410. Step 902 includes determining a signal for respective ones of the haptic stimulation elements 410, in one embodiment. Step 902 includes determining whether each stimulation element 410 should be active or inactive, in one embodiment. Numerous examples of step 902 are discussed herein.

In one embodiment, the UE 110 also determines a presentation mode for the user. The presentation mode refers to a mode or manner in which the information is presented in the haptic stimulation interface 250. The presentation mode may be independent of the configuration of the pattern of stimulation elements 410. In the event that the UE 110 determines the presentation mode, the UE 110 formats the information in response to the presentation mode. For example, the UE 110 might map symbolic representations of letters to the pattern of stimulation elements 410 in response to the presentation mode being a first mode, and map visual waveform representations of sounds of letters to the pattern of stimulation elements in response to the presentation mode being a second mode, in one embodiment.

Step 904 includes the wireless communication device sending the formatted information to the haptic stimulation device 240. The information is sent over a wireless communication link, in one embodiment.

Step 906 includes the haptic stimulation device 240 presenting the formatted information in the pattern of haptic stimulation elements 410. For example, the haptic stimulation device 240 could be driven as depicted with reference to any of FIGS. 5-8. In one embodiment, after driving the haptic stimulation device 240 to represent one piece of information, the haptic stimulation device 240 is driven to display another piece of information in response to feedback from the user. For example, after presenting the "A" the system waits for some feedback from the user (e.g., removing finger from the haptic stimulation interface 250) before presenting the letter "C" in the haptic stimulation interface 250. In one embodiment, after driving the haptic stimulation device 240 to represent one piece of information, the haptic stimulation device 240 may be driven to display another piece of information without any explicit feedback from the user. For example, the haptic stimulation device 240 could be driven to present the letter "A" as shown in FIG. 5, followed by presenting the letter "C" after some pre-determined time, without any feedback from the user.

Figure 10:
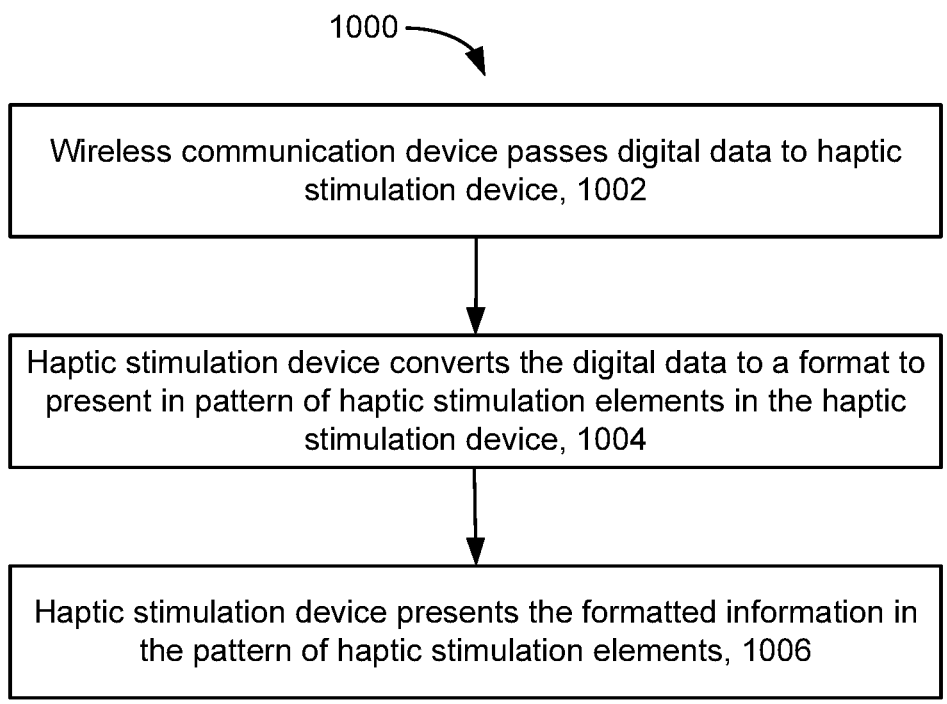
FIG. 10 is a flowchart of one embodiment of a process of presenting information in a haptic stimulation interface.

FIG. 10 is a flowchart of one embodiment of a process 1000 of presenting information in a haptic stimulation interface 250. The information is any digital data on the UE 110, in one embodiment. For example, the information could be textual content, image content, audio content, but is not limited thereto. In process 1000, the UE 110 provides the information to the haptic stimulation device 240 in a raw format.

Step 1002 includes a wireless communication device passing digital data to the haptic stimulation device 240. The format of the digital data could vary with implementation. For example, text data could be passed by passing an ASCII character. Image data could be passed in any format including, but not limited to JPEG (Joint Photographic Experts Group), GIF (Graphics Interchange Format), PNG (Portable Network Graphics), TIFF (Tagged Image File Format), BMP (Windows bitmap), etc. Audio data could be passed in any format including, but not limited to WAV (Waveform Audio File), AIFF (Audio Interchange File Format), MP3, AAC (Advanced Audio Coding), WMA (Windows Media Audio), etc.

Step 1004 includes the haptic stimulation device 240 converting the information to a format suitable for the pattern of haptic stimulation elements 410. Step 1004 may be similar to step 902 of process 900. The format depends on the configuration of the pattern of stimulation elements 410. Step 1004 includes determining a signal for respective ones of the haptic stimulation elements 410, in one embodiment. Step 1004 includes determining whether each stimulation element 410 should be active or inactive, in one embodiment.

In one embodiment, the haptic stimulation device 240 also determines a presentation mode for the user. In one embodiment, the UE 110 informs the haptic stimulation device 240 of the presentation mode. In either case, the haptic stimulation device 240 may format the information after the presentation mode is known, in one embodiment. For example, the haptic stimulation device 240 might map symbolic representations of letters to the pattern of stimulation elements 410 in response to the presentation mode being a first mode, and map visual waveform representations of sounds of letters to the pattern of stimulation elements in response to the presentation mode being a second mode, in one embodiment.

Step 1006 includes the haptic stimulation device 240 presenting the formatted information in the pattern of haptic stimulation elements 410. Step 1006 may be similar to step 906 of process 900.

Figure 11:
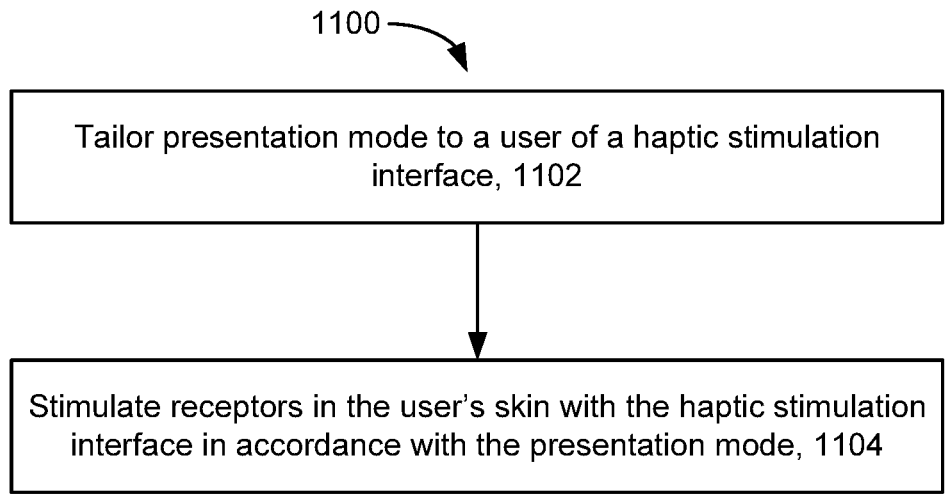
FIG. 11 is a flowchart of one embodiment of a process of presenting information in a haptic stimulation interface.

FIG. 11 is a flowchart of one embodiment of a process of presenting information in a haptic stimulation interface 250. The process 1100 may be used to help a user to progressively adapt to the haptic stimulation interface 250.

Step 1102 includes tailoring a presentation mode to the user of the haptic stimulation interface 250. One technique to tailor the presentation mode to the user is to allow the user to select how the information is formatted. For example, the user can select whether the information is presented in symbolic format (e.g., letters of an alphabet) or as a visual representation of a waveform of the sound of a letter or word. Another example is to allow the user to select whether the information is presented in a spatial representation or a temporal representation.

Step 1104 includes stimulating receptors in the user's skin with the haptic stimulation interface 250 in order to present information in accordance with the presentation mode.

Figure 12:
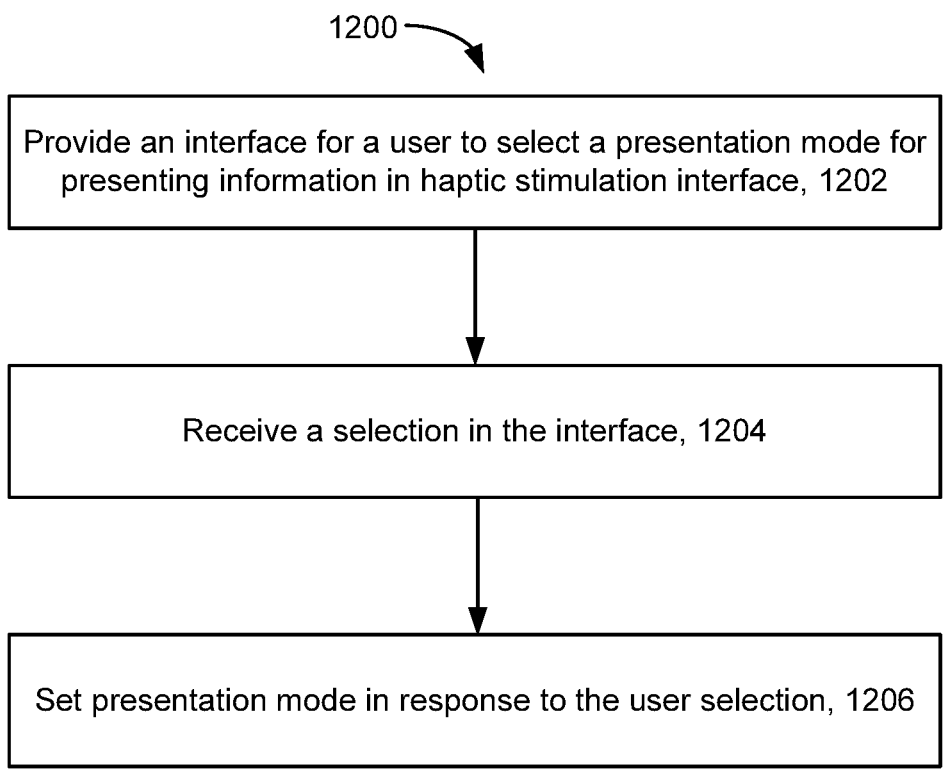
FIG. 12 is a flowchart of one embodiment of a process of allowing a user to select a presentation mode.
Figure 13:
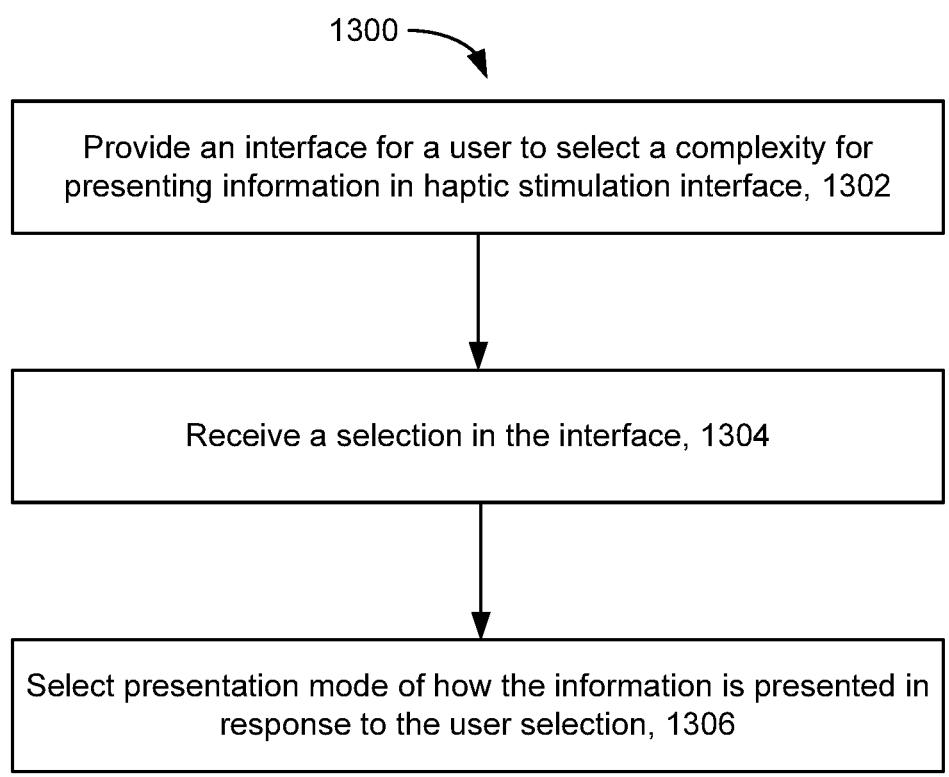
FIG. 13 is a flowchart of one embodiment of a process of allowing a user to select a complexity of a presentation mode.

FIGS. 12 and 13 provide further details of embodiments of tailoring the presentation mode to the user. FIG. 12 describes a technique that allows a user to select the presentation mode by specifying the presentation mode. FIG. 13 describes a technique that allows a user to select the presentation mode by specifying a complexity of the presentation mode.

Referring now to FIG. 12, a flowchart of a process 1200 of allowing a user to select a presentation mode is depicted. Step 1202 includes providing an interface for a user to select a presentation mode for presenting information in a haptic stimulation device 240. This presentation mode could be for all content to be presented on the haptic stimulation interface 250 for the user or for some subset of content. The user interface is presented in a display screen of the UE 110 (e.g., a wireless communication device, cellular telephone, etc.), in one embodiment. The interface allows the user to select between presentation modes such as symbolic representations of letters, symbolic representations of words, visual waveform representations of sounds of letters, visual waveform representations of sounds of words, a spatial representation of an image, and/or a temporal representation of an image. These presentation modes are not necessarily mutually exclusive. For example, a user could select either the spatial or the temporal mode with another one of the modes. In one embodiment, the user is requested to select one presentation mode from a set of presentation modes. This set does not necessarily include all of the presentation modes that are possible. For example, the set might exclude the spatial and the temporal mode. The interface allows the user to select different presentation modes for different types of content, in one embodiment. For example, the user might be allowed to select different presentation modes for emails and for Internet browsing. As another example, the user might be allowed to select different presentation modes for emails and for voicemails.

Step 1204 includes receiving a selection in the interface. This selection specifies at least one presentation mode, in one embodiment.

Step 1206 includes setting a presentation mode in response to the user selection. As noted, the presentation mode could be for all content to be presented on the haptic stimulation interface 250 for this user or for some subset of content.

Referring now to FIG. 13, a flowchart of a process 1300 of allowing a user to select a complexity of a presentation mode is depicted. Step 1302 includes providing an interface for a user to select a level of complexity of the presentation mode for presenting information in a haptic stimulation device 240. This presentation mode could be for all content to be presented in the haptic stimulation interface 250 for the user or for some subset of content. The user interface is presented in a screen of a wireless communication device (e.g., cellular telephone), in one embodiment. The interface allows the user to select a level of complexity based on a scale, in one embodiment. For example, the user may be allowed to select a value between some range (e.g., between 1 to 10). In one embodiment, the user interface has a bar (or other element) that can be moved (e.g., slid) by the user to select the level of complexity of the presentation mode. The user interface does not necessarily specify the presentation mode.

Step 1304 includes receiving a selection in the interface. This selection specifies a value without specifically identifying a presentation mode, in one embodiment. In one embodiment, the selection is specified in terms such as "novice," "intermediate," and "advanced."

Step 1306 includes setting a presentation mode in response to the user selection. This may include determining a presentation mode for the selection that was received in step 1304.

Figure 14:
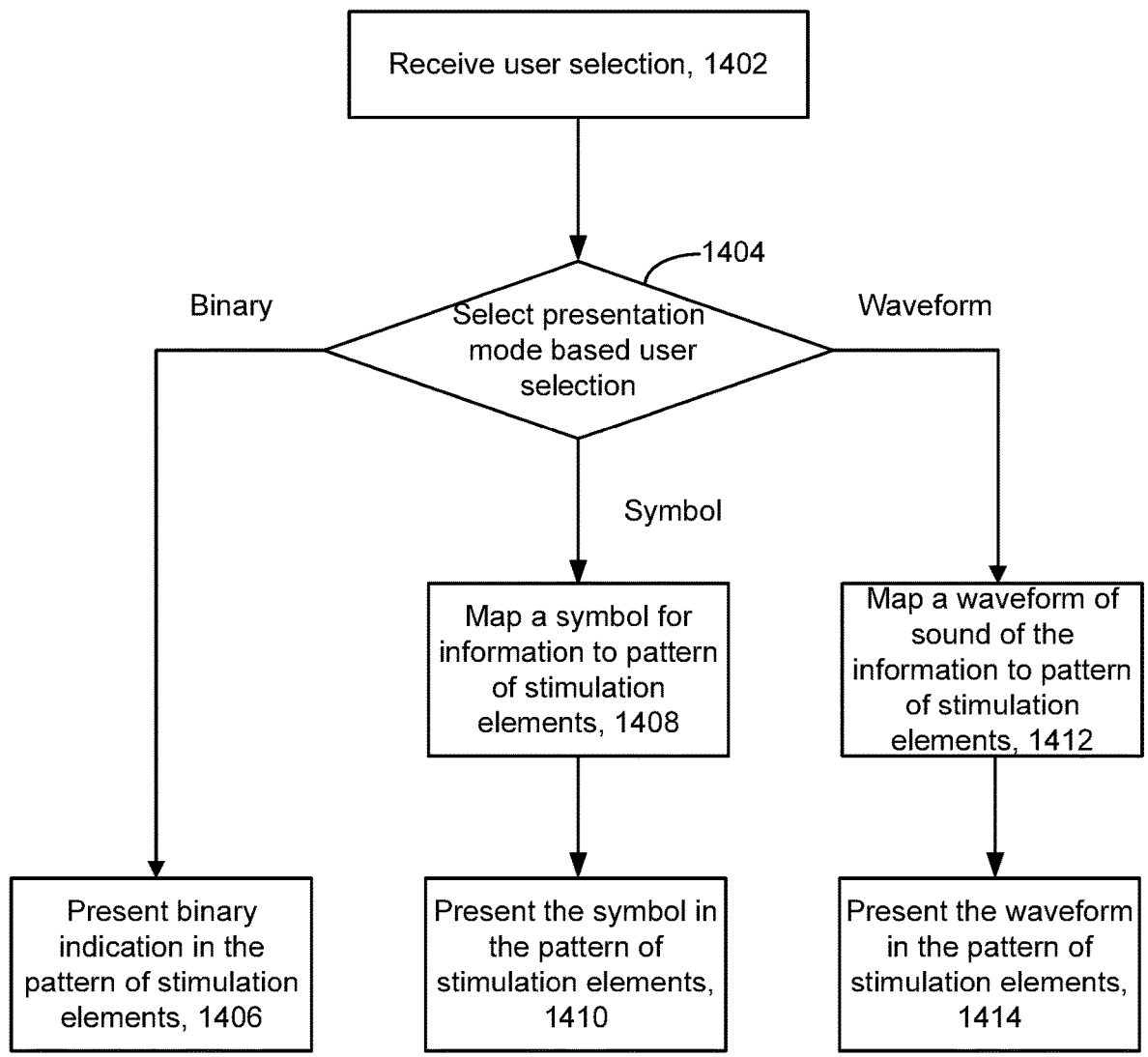
FIG. 14 is a flowchart of one embodiment of a process of presenting information in a haptic stimulation interface in different presentation modes.

FIG. 14 is a flowchart of one embodiment of a process 1400 of presenting information in a haptic stimulation interface 250 in different presentation modes. Step 1402 includes receiving a user selection of a presentation mode. In one embodiment, the UE 110 presents an interface for the user to select the presentation mode. In one embodiment, the user selects between the following presentation modes: binary, symbol, and waveform. Here, a binary presentation mode refers to the elements 410 in the haptic stimulation interface 250 being used to represent one of two states. In one embodiment, all of the elements 410 are active for a first state and inactive for a second state. However, it is not required that all of the elements 410 be active in the first state, as even a subset of less than all of the elements 410 may be suitable to indicate the first state. A symbol presentation mode may include, but is not limited to, symbolic representations of letters, symbolic representations of words, symbolic representations of characters for writing a language. A waveform presentation mode may include, but is not limited to, visual waveform representations of sounds of letters, and visual waveform representations of sounds of words.

Step 1404 includes selecting a presentation mode based on the user selection. In one embodiment, step 1404 is performed by the UE 110. FIG. 14 shows one of three paths being taken, depending on the presentation mode. In response to the presentation mode being the binary presentation mode, step 1406 is performed. In step 1406 a binary indication is presented in the pattern of stimulation elements 410. As discussed above, this may include using the elements 410 to indicate either a first state or a second state.

In response to the presentation mode being the symbol presentation mode, steps 1408 and 1410 are performed. Steps 1408-1410 describe presenting some information in symbolic form. The information might be a letter of an alphabet, a word constructed of two or more letters of an alphabet, a character used to write a language, etc. Step 1408 includes mapping a symbol for the information to the pattern of stimulation elements 410. With reference to FIG. 5, one example is to map the letter "A" to the stimulation elements 410. With reference to FIG. 6, one example is to map a symbol of a heart to the stimulation elements 410 in order to symbolize the word "love." In one embodiment, step 1408 includes accessing a predetermined mapping from, for example, a character used to write a language, to the pattern of stimulation elements 410. Step 1410 includes presenting the symbol in the pattern of stimulation elements 410. In one embodiment, step 1408 is performed by the UE 110 and step 1410 is performed by the haptic stimulation device 240. In one embodiment, both steps 1408 and 1410 are performed by the haptic stimulation device 240.

In response to the presentation mode being the waveform presentation mode, steps 1412 and 1414 are performed. Steps 1412-1414 describe presenting some information in waveform presentation mode. The information might be the sound of a letter of an alphabet, the sound of a word in any language, but is not limited thereto. Step 1412 includes mapping a waveform representation of the sound to the pattern of stimulation elements 410. With reference to FIG. 7, one example is to map a visual waveform representation of the spoken sound of the letter "A" to the stimulation elements 410. With reference to FIG. 8, one example is to map a visual waveform representation of the spoken sound of the word "love" to the stimulation elements 410. In one embodiment, step 1412 includes accessing a predetermined mapping. For example, there may be a predetermined mapping of the visual waveform representation of each letter of an alphabet to the stimulation elements 410. In one embodiment, step 1412 includes mapping from an audio clip to the stimulation elements 410. Step 1414 includes presenting the visual waveform representation in the pattern of stimulation elements 410. In one embodiment, step 1412 is performed by the UE 110 and step 1414 is performed by the haptic stimulation device 240. In one embodiment, both steps 1412 and 1414 are performed by the haptic stimulation device 240.

Figure 15:
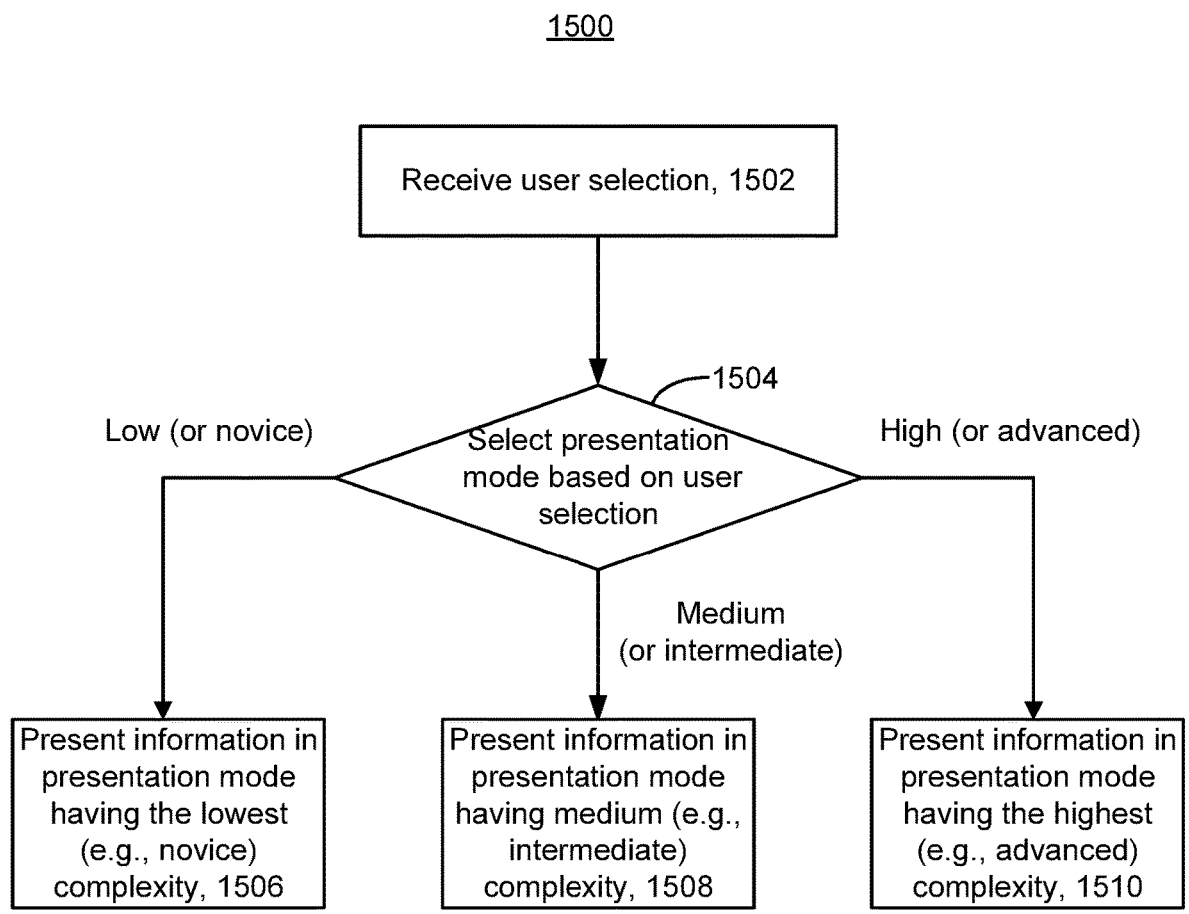
FIG. 15 is a flowchart of one embodiment of a process of presenting information in a haptic stimulation interface in different presentation modes.

FIG. 15 is a flowchart of one embodiment of a process 1500 of presenting information in a haptic stimulation device 240 in different presentation modes. Step 1502 includes receiving a user selection of a level of complexity of the presentation mode. In one embodiment, the UE 110 presents an interface for the user to select the level of complexity of the presentation mode. In one embodiment, the user selects between the following levels of complexity of presentation modes: novice, intermediate, advanced. The selection could be between other options such as: low, medium, high. The selection could be on a sliding scale, such as a number between 1 to 10.

Step 1504 includes selecting a presentation mode based on the user selection. In one embodiment, step 1504 is performed by the UE 110. One example is for the presentation modes to be binary, symbol, and waveform, as was the case in process 1400. In this case binary may be the lowest complexity, symbol may be medium complexity, and waveform may be the highest complexity. However, this is just one example.

FIG. 15 shows one of three paths being taken, depending on the presentation mode. In response to the user selected a low (or novice) mode, the information is presented in a presentation mode having the lowest complexity, in step 1506. In response to the user selected a medium (or intermediate) mode, the information is presented in a presentation mode having medium complexity, in step 1508. In response to the user selected a high (or advanced) mode, the information is presented in a presentation mode having the highest complexity, in step 1510.

In one embodiment of process 1500, the UE 110 selects the presentation mode, formats the data such that it is suitable for presentation on the pattern of stimulation elements 410, and sends the formatted data to the haptic stimulation device 240. In one embodiment of process 1500, the UE 110 selects the presentation mode, informs the haptic stimulation device 240 of the presentation mode, sends raw data to the haptic stimulation device 240, and the haptic stimulation device 240 formats the raw data for proper representation on the pattern of stimulation elements 410.

Figure 16:
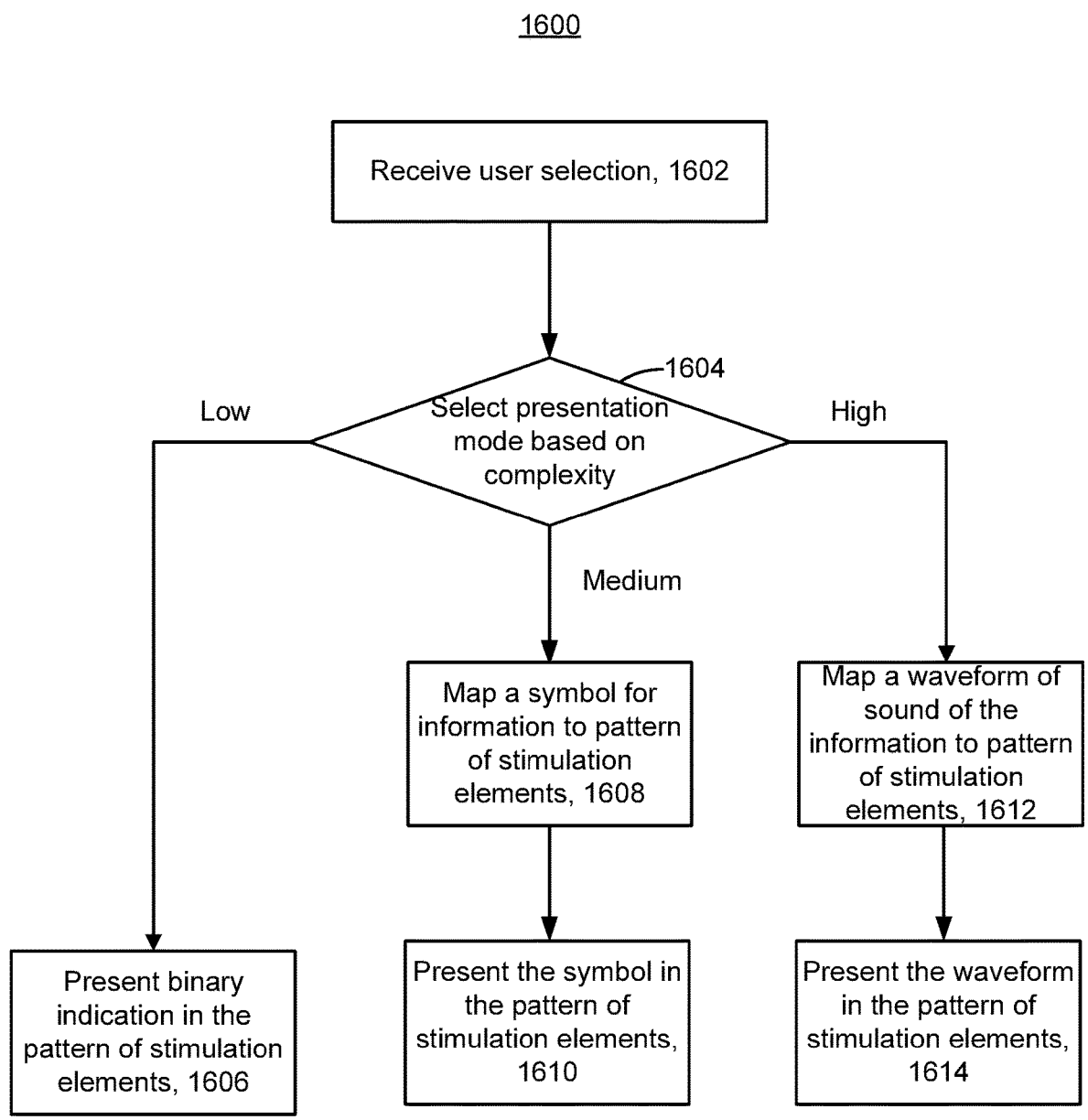
FIG. 16 is a flowchart of one embodiment of a process of presenting information in a haptic stimulation interface in different presentation modes.

FIG. 16 is a flowchart of one embodiment of a process 1600 of presenting information in a haptic stimulation interface 250 in different presentation modes. FIG. 16 is one embodiment of process 1500. Steps 1602 includes receiving a user selection of a level of complexity of the presentation mode. In one embodiment, the UE 110 presents an interface for the user to select the level of complexity of the presentation mode. In one embodiment, the user selects between the following levels of complexity of presentation modes: novice, intermediate, advanced. The selection could be between other options such as: low, medium, high. The selection could be on a sliding scale, such as a number between 1 to 10.

Step 1604 includes selecting a presentation mode based on the user selection. In one embodiment, step 1604 is performed by the UE 110. In this embodiment, the presentation modes are binary, symbol, and waveform. In this embodiment, binary may be the lowest complexity, symbol may be medium complexity, and waveform may be the highest complexity. FIG. 16 shows one of three paths being taken, depending on the presentation mode. In response to the user selected a low (or novice) mode, the information is presented in a binary presentation mode, in step 1606. Step 1606 may be similar to step 1406, and hence will not be described in detail. In response to the user selected a medium (or intermediate) mode, the information is presented in a symbol presentation mode, in steps 1608-1610. Steps 1608-1610 may be similar to steps 1408-1410, and hence will not be described in detail. In response to the user selected a high (or advanced) mode, the information is presented in a waveform presentation mode, in steps 1612-1614. Steps 1612-1614 may be similar to steps 1412-1414, and hence will not be described in detail.

Figure 17:
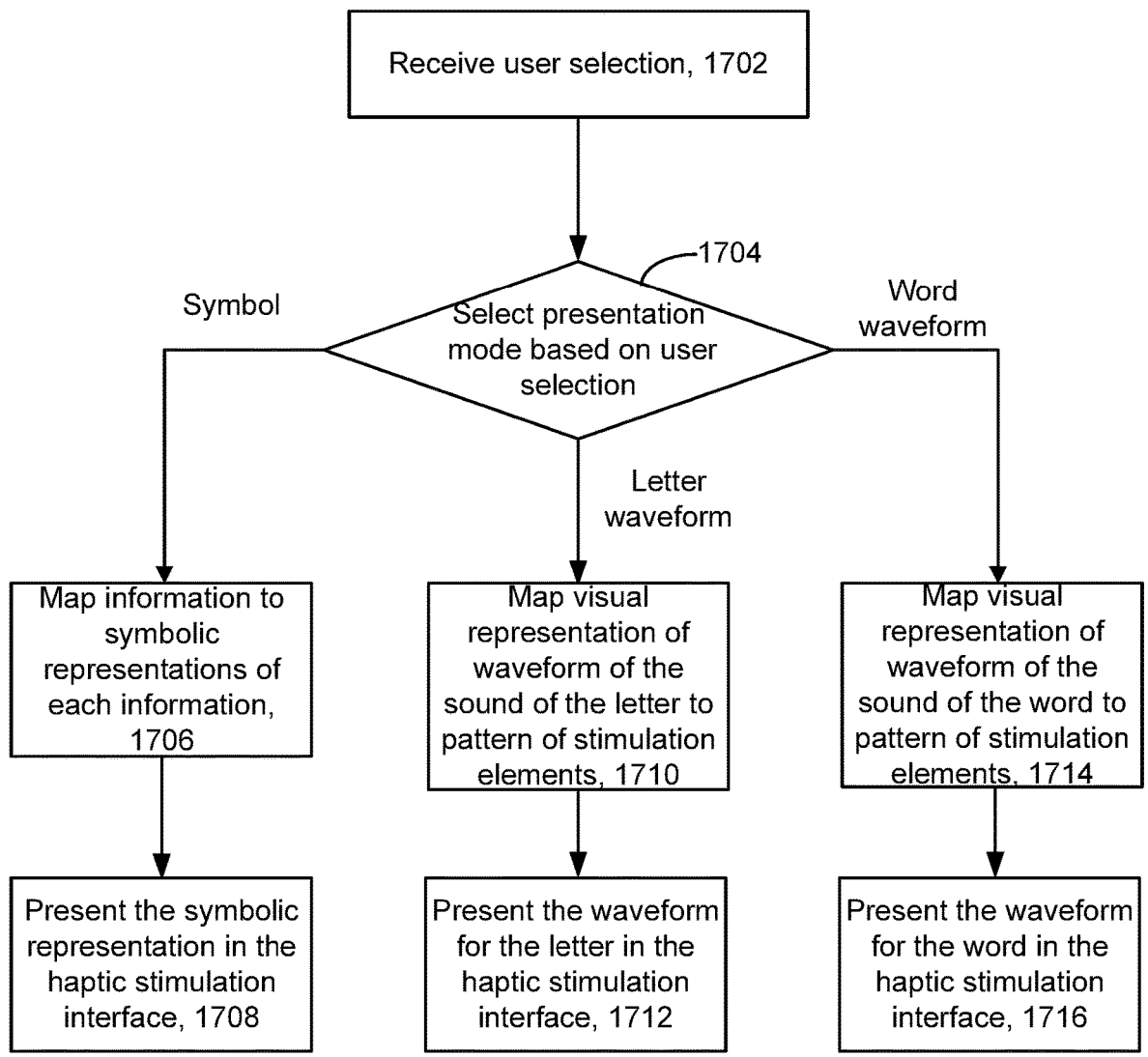
FIG. 17 is a flowchart of one embodiment of a process of presenting information in a haptic stimulation interface in different presentation modes.

FIG. 17 is a flowchart of one embodiment of a process 1700 of presenting information in a haptic stimulation interface 250 in different presentation modes. Step 1702 includes receiving a user selection of a presentation mode. In one embodiment, the UE 110 presents an interface for the user to select the presentation mode. In one embodiment, the user selects between the following presentation modes: symbol, letter waveform, and word waveform. A symbol presentation mode may include, but is not limited to, symbolic representations of letters, symbolic representations of words, symbolic representations of characters for writing a language. A letter waveform presentation mode includes visual waveform representations of sounds of letters. A word waveform presentation mode includes visual waveform representations of sounds of words.

Step 1704 includes selecting a presentation mode based on the user selection. In one embodiment, step 1704 is performed by the UE 110. FIG. 17 shows one of three paths being taken, depending on the presentation mode. In response to the presentation mode being the symbol presentation mode, steps 1706 and 1708 are performed. Steps 1706-1708 describe presenting some information in symbolic form. The information might be a letter of an alphabet, a word constructed of two or more letters of an alphabet, character used to write a language. Step 1706 includes mapping a symbol for the information to the pattern of stimulation elements 410. With reference to FIG. 5, one example is to map the letter "A" to the stimulation elements 410. With reference to FIG. 6, one example is to map a symbol of a heart to the stimulation elements 410 in order to symbolize the word "love." In one embodiment, step 1706 includes accessing a predetermined mapping from, for example, a character used to write a language, to the pattern of stimulation elements 410. Step 1708 includes presenting the symbol in the pattern of stimulation elements 410. In one embodiment, step 1706 is performed by the UE 110 and step 1708 is performed by the haptic stimulation device 240. In one embodiment, both steps 1706 and 1708 are performed by the haptic stimulation device 240.

In response to the presentation mode being the letter waveform presentation mode, steps 1710 and 1712 are performed. Steps 1712-1714 describe presenting a waveform for the sound of a letter in the pattern of stimulation elements 410. Step 1710 includes mapping a waveform representation of the sound to the pattern of stimulation elements 410. With reference to FIG. 7, one example is to map a visual waveform representation of the spoken sound of the letter "A" to the stimulation elements 410. In one embodiment, step 1710 includes accessing a predetermined mapping. For example, there may be a predetermined mapping of the visual waveform representation of the sound of each letter of an alphabet to the stimulation elements 410. This mapping process could start with a textual representation of a letter of an alphabet, and use the predetermined mapping of the visual waveform representation of the sound of that letter to determine how to activate the stimulation elements 410. This is one example of converting text into a non-textual image that represents the text. In one embodiment, step 1710 includes mapping from an audio clip to the stimulation elements 410. When mapping the audio clip to the stimulation elements 410, the predetermined mapping of the visual waveform representation of the sound of each letter of the alphabet to the stimulation elements 410 is not necessarily needed. Step 1712 includes presenting the visual waveform representation in the pattern of stimulation elements 410. In one embodiment, step 1710 is performed by the UE 110 and step 1712 is performed by the haptic stimulation device 240. In one embodiment, both steps 1710 and 1712 are performed by the haptic stimulation device 240.

In response to the presentation mode being the word waveform presentation mode, steps 1714 and 1716 are performed. Steps 1714-1716 describe presenting a waveform for the sound of a word in the pattern of stimulation elements 410. Step 1714 includes mapping a waveform representation of the sound of the word to the pattern of stimulation elements 410. With reference to FIG. 8, one example is to map a visual waveform representation of the spoken sound of the word "love" to the stimulation elements 410. In one embodiment, step 1714 includes accessing a predetermined mapping. For example, there may be a predetermined mapping of the visual waveform representation of words to the stimulation elements 410. In one embodiment, step 1714 includes mapping from an audio clip to the stimulation elements 410. Step 1716 includes presenting the visual waveform representation of the sound of the word in the pattern of stimulation elements 410. In one embodiment, step 1714 is performed by the UE 110 and step 1716 is performed by the haptic stimulation device 240. In one embodiment, both steps 1714 and 1716 are performed by the haptic stimulation device 240.

Note that some of the presentation modes in FIG. 17 may be more efficient at presenting information to the user than others. In some cases, the visual representation of the waveform of the word may be more efficient than the visual representation of the waveform of the letter. Not only does this allow the user to select a presentation mode to save the user's time, but this may allow the user to select a presentation mode that saves power and extend battery life of the haptic stimulation device 240 and/or UE 110.

Figure 18:
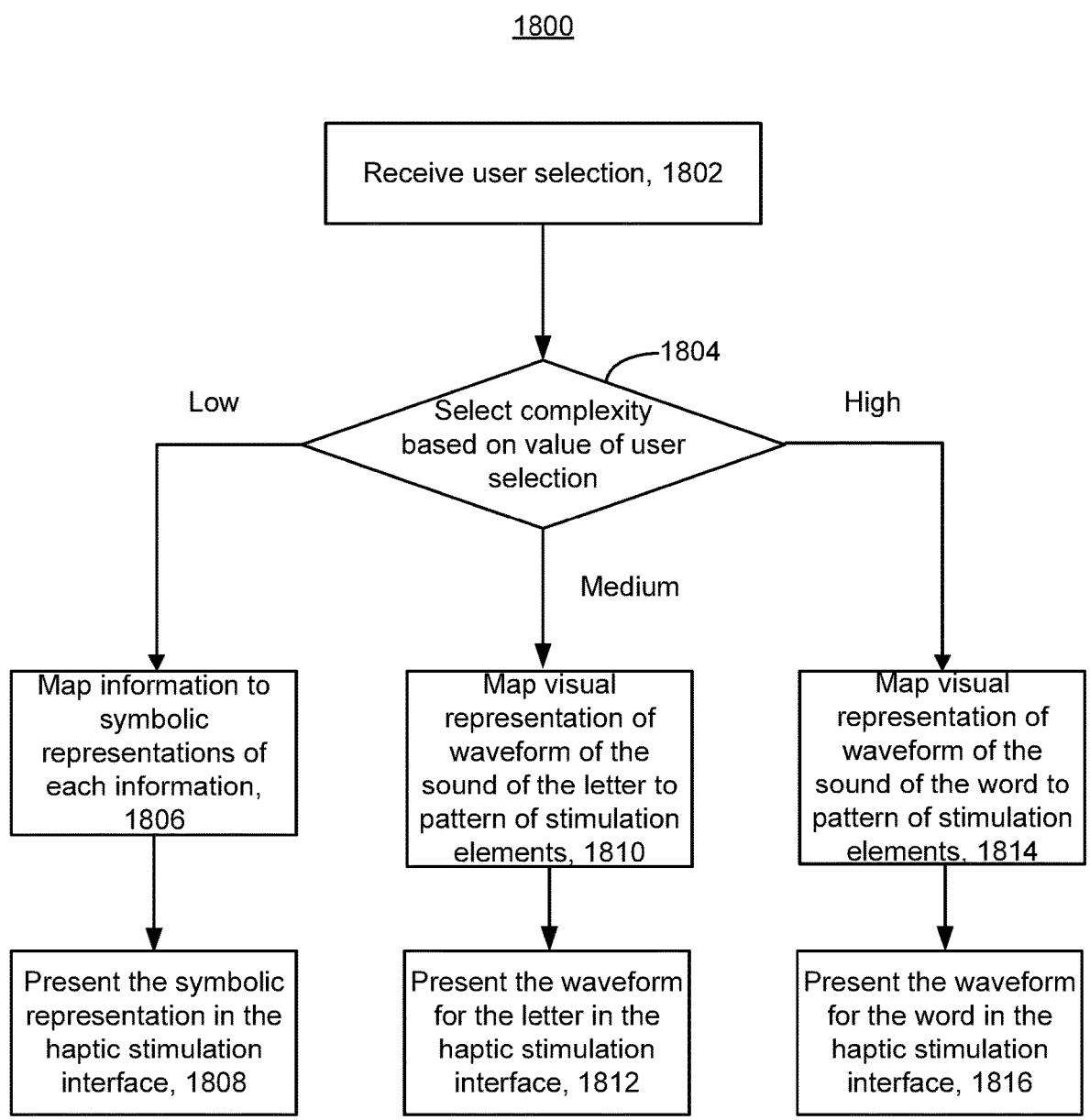
FIG. 18 is a flowchart of one embodiment of a process of presenting information in a haptic stimulation interface in different presentation modes.

FIG. 18 is a flowchart of one embodiment of a process 1800 of presenting information in a haptic stimulation interface 250 in different presentation modes. Step 1802 includes receiving a user selection of a presentation mode. In one embodiment, the UE 110 presents an interface for the user to select the presentation mode. In one embodiment, the user selects between the following presentation modes: low complexity, medium complexity, and high complexity.

Step 1804 includes selecting a presentation mode based on the user selection. In one embodiment, step 1804 is performed by the UE 110. FIG. 18 shows one of three paths being taken, depending on the presentation mode. In response to the user selecting low complexity, steps 1806-1808 are performed. Steps 1806-1808 describe presenting some information in symbolic form. The information might be a letter of an alphabet, a word constructed of two or more letters of an alphabet, character used to write a language. Step 1806 includes mapping a symbol for the information to the pattern of stimulation elements 410. With reference to FIG. 5, one example is to map the letter "A" to the stimulation elements 410. With reference to FIG. 6, one example is to map a symbol of a heart to the stimulation elements 410 in order to symbolize the word "love." In one embodiment, step 1806 includes accessing a predetermined mapping from, for example, a character used to write a language, to the pattern of stimulation elements 410. Step 1808 includes presenting the symbol in the pattern of stimulation elements 410. In one embodiment, step 1806 is performed by the UE 110 and step 1808 is performed by the haptic stimulation device 240. In one embodiment, both steps 1806 and 1808 are performed by the haptic stimulation device 240.

In response to the user selecting a medium complexity presentation mode, steps 1810 and 1812 are performed. Steps 1812-1814 describe presenting a waveform for the sound of a letter in the pattern of stimulation elements 410. Step 1810 includes mapping a waveform representation of the sound to the pattern of stimulation elements 410. With reference to FIG. 7, one example is to map a visual waveform representation of the spoken sound of the letter "A" to the stimulation elements 410. In one embodiment, step 1810 includes accessing a predetermined mapping. For example, there may be a predetermined mapping of the visual waveform representation of each letter of an alphabet to the stimulation elements 410. In one embodiment, step 1810 includes mapping from an audio clip to the stimulation elements 410. Step 1812 includes presenting the visual waveform representation in the pattern of stimulation elements 410. In one embodiment, step 1810 is performed by the UE 110 and step 1812 is performed by the haptic stimulation device 240. In one embodiment, both steps 1810 and 1812 are performed by the haptic stimulation device 240.

In response to the user selecting a high complexity presentation mode, steps 1814 and 1816 are performed. Steps 1814-1816 describe presenting a waveform for the sound of a word in the pattern of stimulation elements 410. Step 1814 includes mapping a waveform representation of the sound of the word to the pattern of stimulation elements 410. With reference to FIG. 8, one example is to map a visual waveform representation of the spoken sound of the word "love" to the stimulation elements 410. In one embodiment, step 1814 includes accessing a predetermined mapping. For example, there may be a predetermined mapping of the visual waveform representation of words to the stimulation elements 410. In one embodiment, step 1814 includes mapping from an audio clip to the stimulation elements 410. Step 1816 includes presenting the visual waveform representation of the sound of the word in the pattern of stimulation elements 410. In one embodiment, step 1814 is performed by the UE 110 and step 1816 is performed by the haptic stimulation device 240. In one embodiment, both steps 1814 and 1816 are performed by the haptic stimulation device 240.

Note that some of the presentation modes in FIG. 17 may be more efficient at presenting information to the user than others. In some cases, the visual representation of the waveform of the word may be more efficient than the visual representation of the waveform of the letter. Not only does this allow the user to select a presentation mode to save the user's time, but this may allow the user to select a presentation mode that saves power and extend battery life of the haptic stimulation device 240 and/or UE 110.

Figure 19:
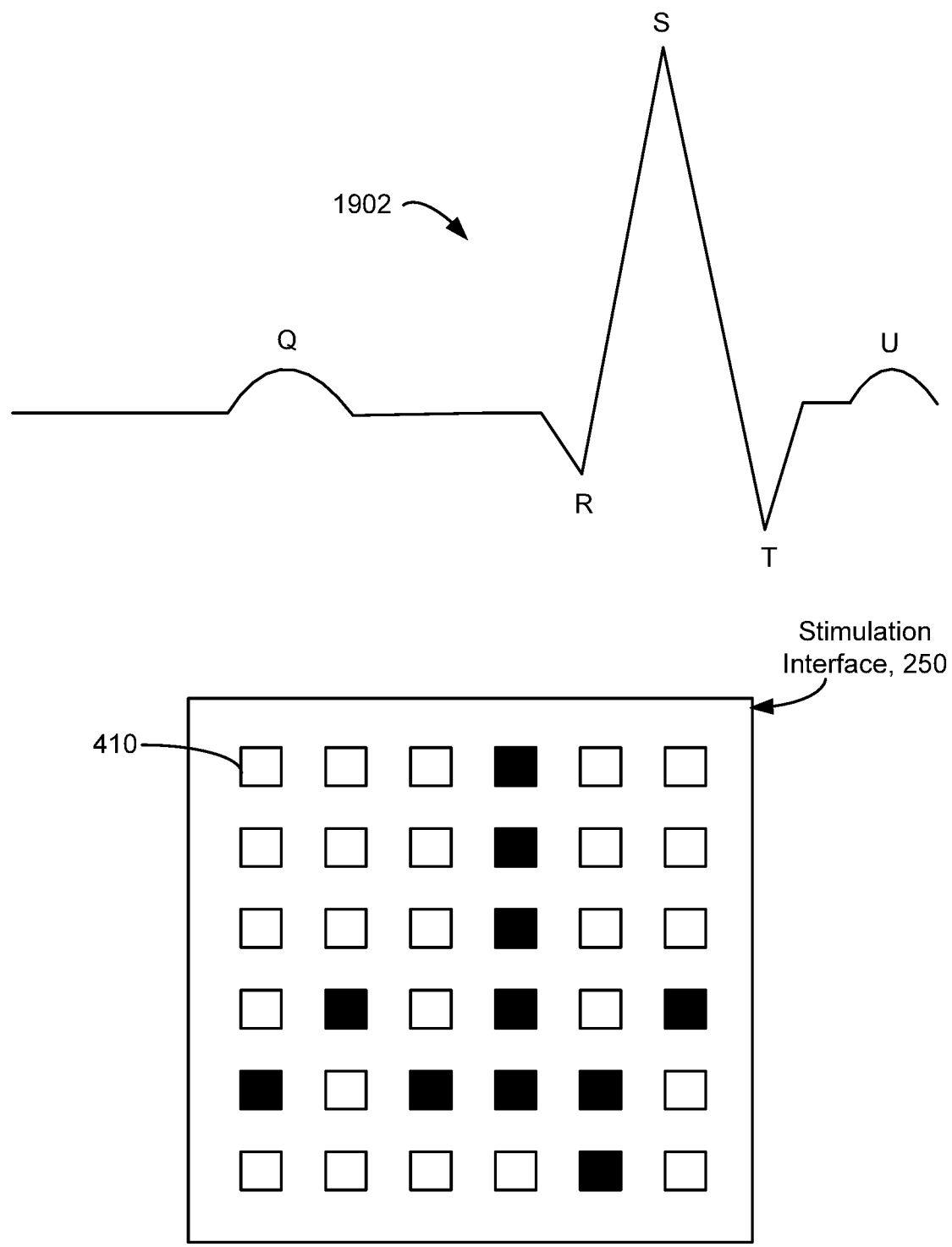
FIG. 19 depicts yet another embodiment of a presentation mode, for presenting information on stimulation interface.

FIG. 19 depicts yet another embodiment of a presentation mode, for presenting information on stimulation interface 250. FIG. 19 depicts what is referred to herein as a spatial presentation mode. In this example, an image 1902 that represents the familiar electro-cardiogram of heart waveform. As is well known, the heart waveform has a U wave, a QRS wave, and a T wave, which are labeled. The image 1902 comprises digital data, in one embodiment. The image 1902 could have any type of format including, but not limited to JPEG, GIF, PNG, TIFF, BMP, etc.

In one embodiment, the image 1902 is mapped to the stimulation elements 410. The mapping is not required to be an exact to scale mapping. In the example of FIG. 19, the Q wave is roughly mapped to the second column of stimulation elements 410 (counting from the left), the QRS wave is roughly mapped to the third to fifth columns, and the T wave is roughly mapped to the sixth column. In a "spatial presentation mode", the entire image 1902 is presented at the same time in the pattern of stimulation elements 410. In other words, all of the active (depicted in black) stimulation elements are active at the same time.

In a "temporal presentation mode", only a selected region of the stimulation elements 410 are used at one time. For example, only one column of the pattern of stimulation elements 410 are used at one time to present the image 1902. FIGS. 20A-20F depict one example of a temporal presentation mode. The image 1902 from FIG. 19 is being presented in a temporal presentation mode. Each of these Figures shows the pattern of stimulation elements 410 for a different point in time, starting with FIG. 20A and ending with FIG. 20F. In this example, only one column of the pattern of stimulation elements 410 is used at one time.

Figure 21:
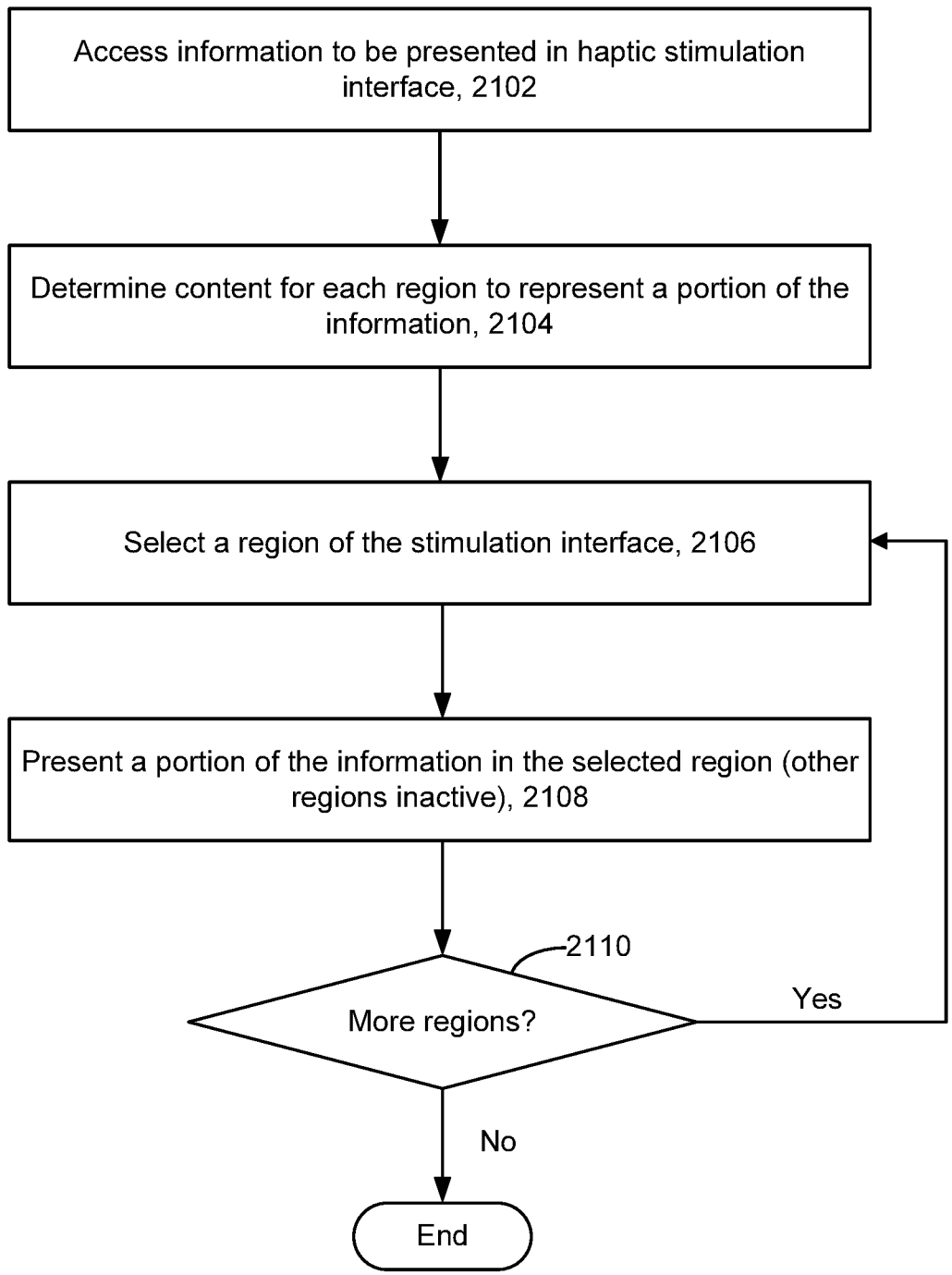
FIG. 21 is a flowchart of one embodiment of a process of presenting information in a stimulation interface in a temporal presentation mode.

FIG. 21 is a flowchart of one embodiment of a process 2100 of presenting information in a stimulation interface 250 in a temporal presentation mode. Step 2102 includes accessing information to be presented in the stimulation interface 250. The information could be analog data or digital data. The information could include textual data, visual data, and/or audio data. The image 1902 from FIG. 19 will be used as an example of the information to be presented.

Step 2104 includes determining what content to present for each region of the stimulation interface 250. Referring back to FIG. 19, step 2104 may include determining how to map the image 1902 to the stimulation interface 250.

Step 2106 includes selecting a region of the stimulation interface 250. In one embodiment, a column is selected. However, the region is not required to be a column. In one embodiment, the region is a row of stimulation elements 410.

Figure 20A:
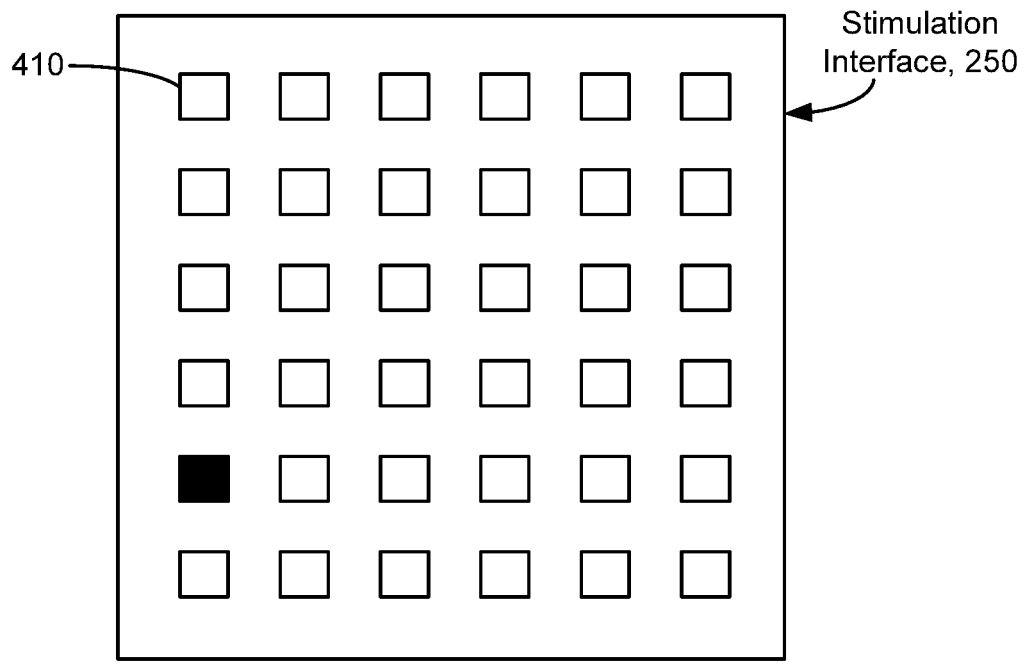
FIGS. 20A-20F depict one example of a temporal presentation mode.
Figure 20B:
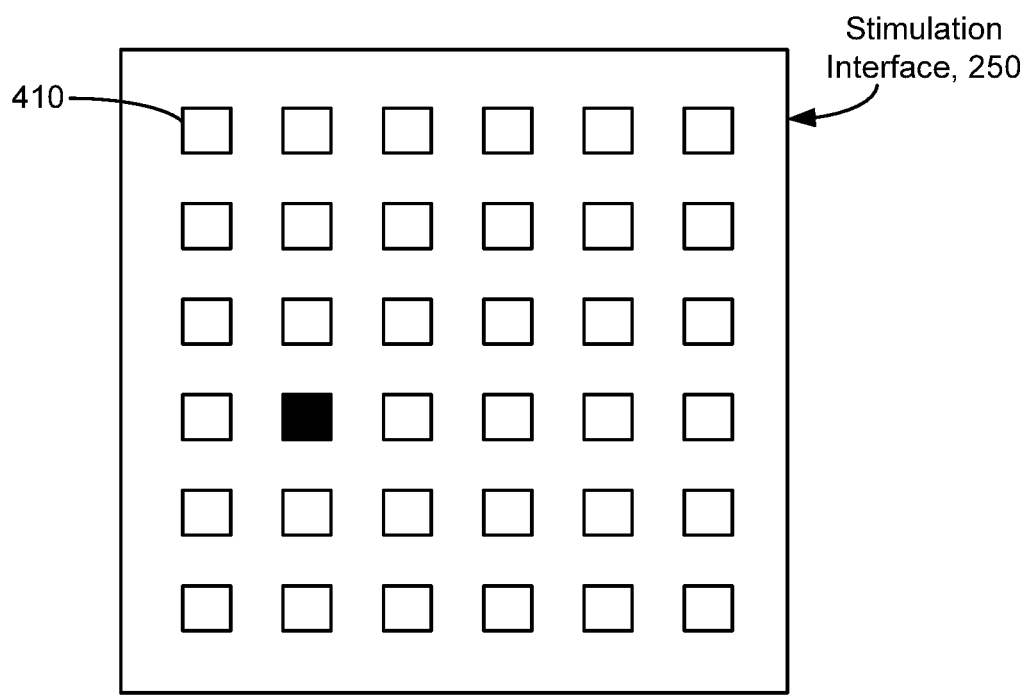
Figure 20C:
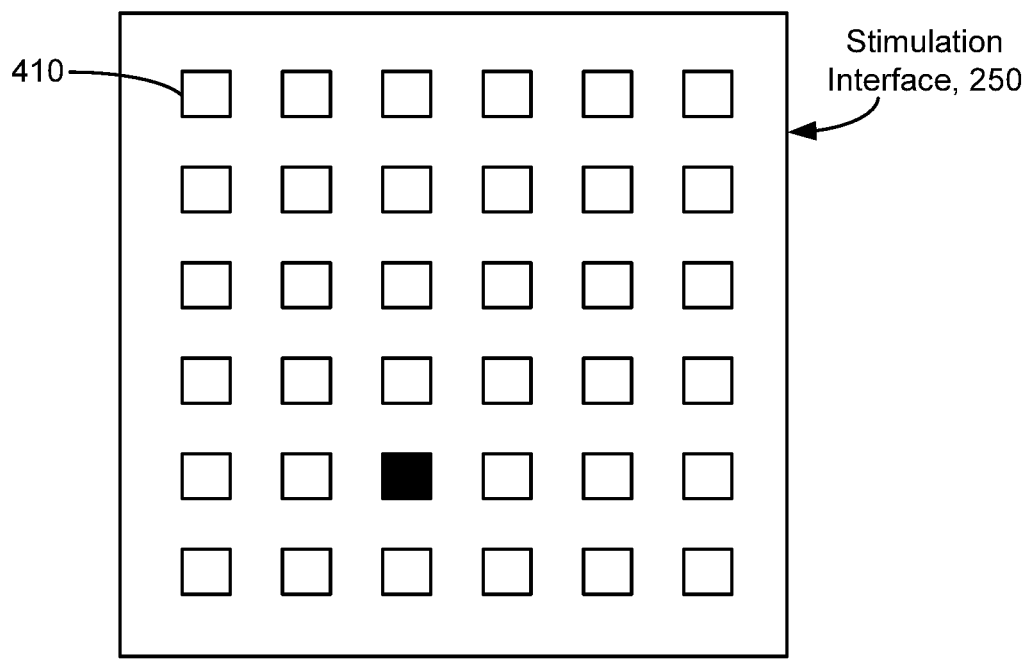
Figure 20D:
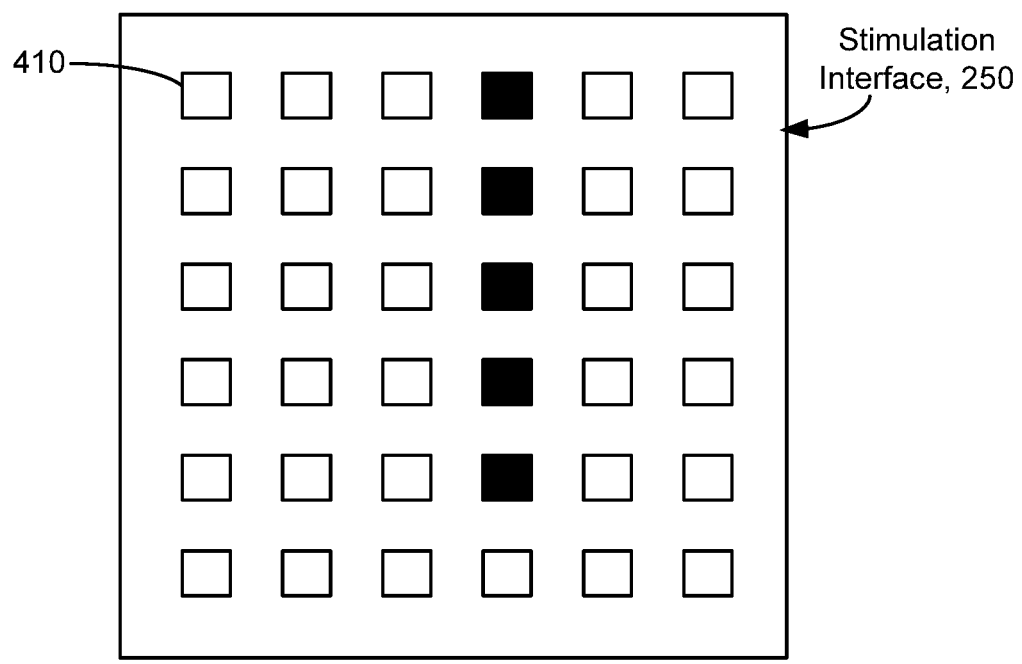
Figure 20E:
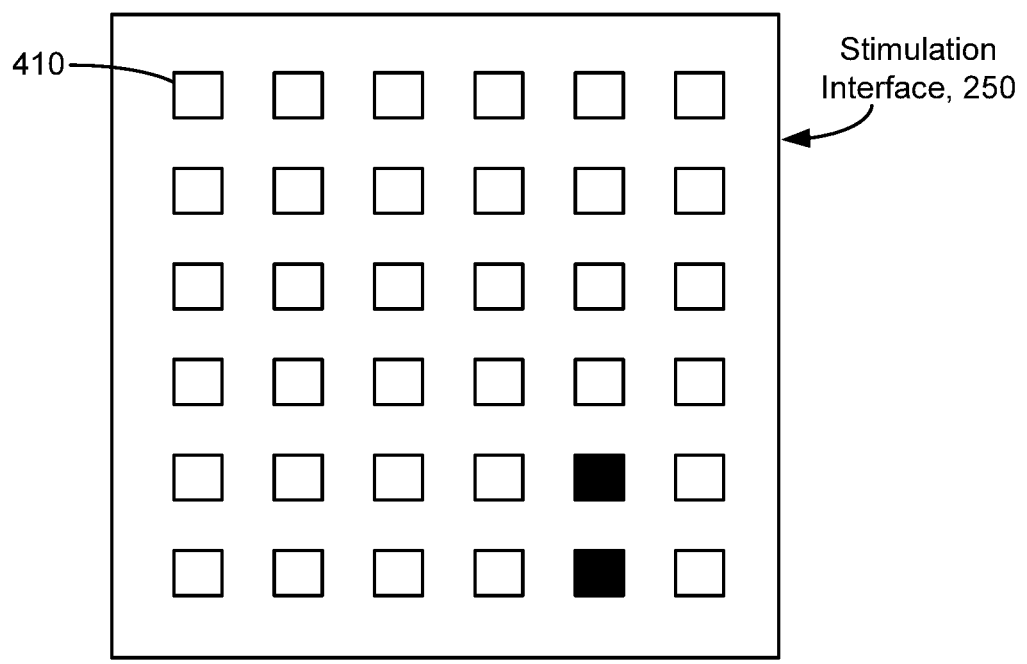
Figure 20F:
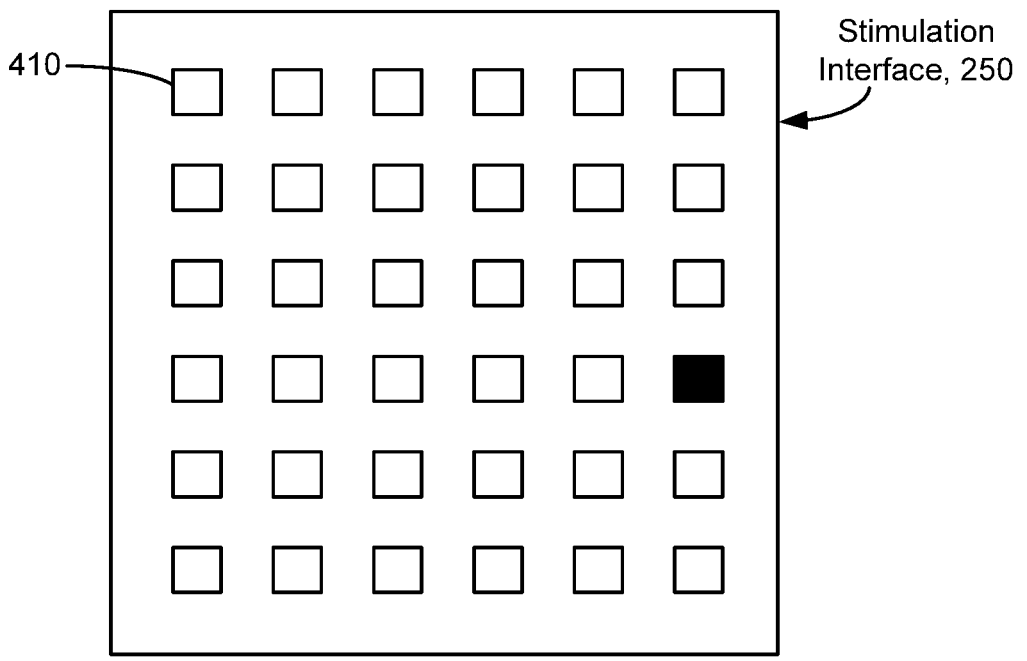

Step 2108 includes representing a portion of the image 1902 in the selected region. With reference to FIG. 20A, a portion of the image 1902 is represented in the stimulation interface 250.

Step 2110 is a determination of whether there are more regions in the stimulation interface 250 for which portion of the image has not yet been presented. If so, control passes to step 2106 to select another region of the stimulation interface 250. This region is adjacent to the previous region in some embodiments. For example, this is an adjacent column (or row). In the present example, the process proceeds sequentially through FIGS. 20A to 20F.

Figure 22:
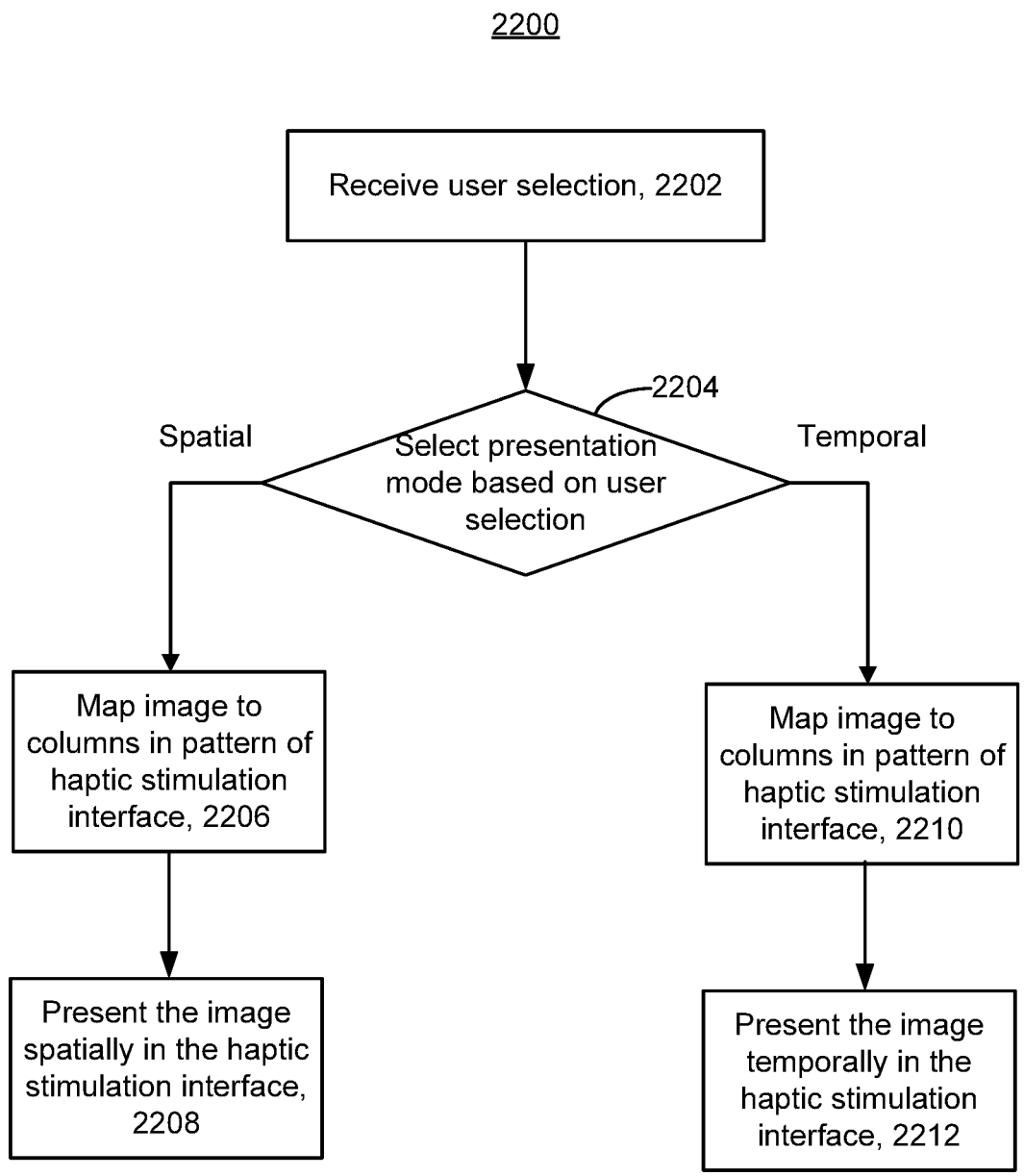
FIG. 22 is a flowchart of one embodiment of a process of presenting information in a stimulation interface in either a spatial presentation mode or a temporal presentation mode.

FIG. 22 is a flowchart of one embodiment of a process 2200 of presenting information in a stimulation interface 250 in either a spatial presentation mode or a temporal presentation mode. This is one embodiment of tailoring a presentation mode to a user. Step 2202 includes receiving a user selection. In one embodiment, the UE 110 presents an interface for the user to select between a spatial presentation mode and a temporal presentation mode.

Step 2204 includes selecting a presentation mode based on the user selection. In one embodiment, step 2204 is performed by the UE 110. FIG. 22 shows one of two paths being taken, depending on the presentation mode. In response to the user selecting a spatial mode, the information is presented in a spatial presentation mode, in steps 2206-2208. Step 2206 includes mapping the image to columns in the pattern of stimulation elements 410. Step 2208 includes presenting the image spatially in the stimulation interface 250. An example of steps 2206-2208 has already been described with respect to FIG. 19.

In response to the user selecting a temporal mode, the information is presented in a temporal presentation mode, in steps 2210-2212. Step 2210 includes mapping the image to columns in the pattern of stimulation elements 410. Step 2212 includes presenting the image temporal in the stimulation interface 250. An example of steps 2210-2212 has already been described with respect to FIGS. 20A-20F and 21.

Figure 23:
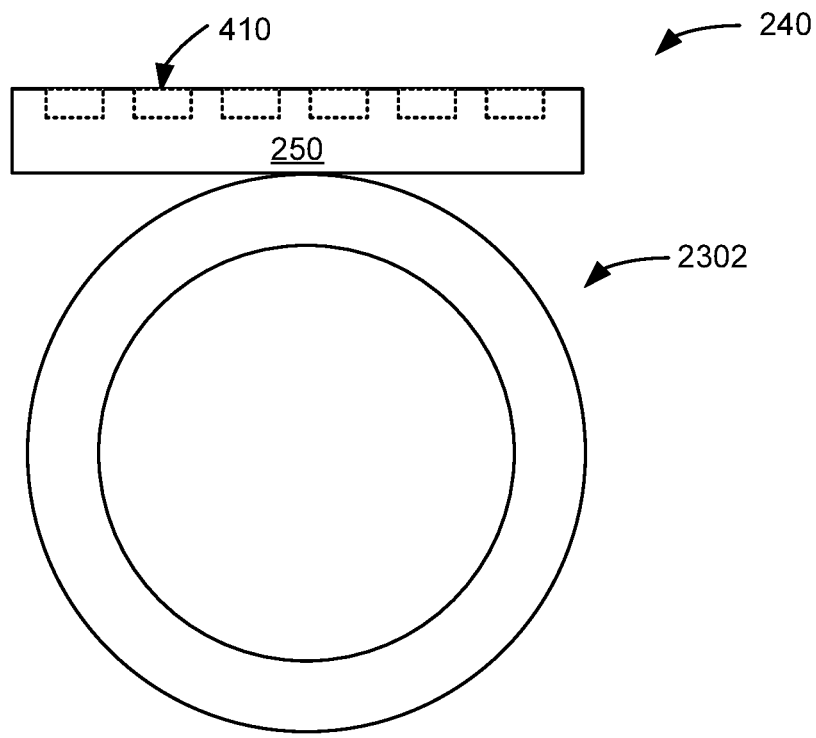
FIG. 23 depicts one embodiment in which the haptic stimulation device has a ring-shaped form factor.
Figure 24:
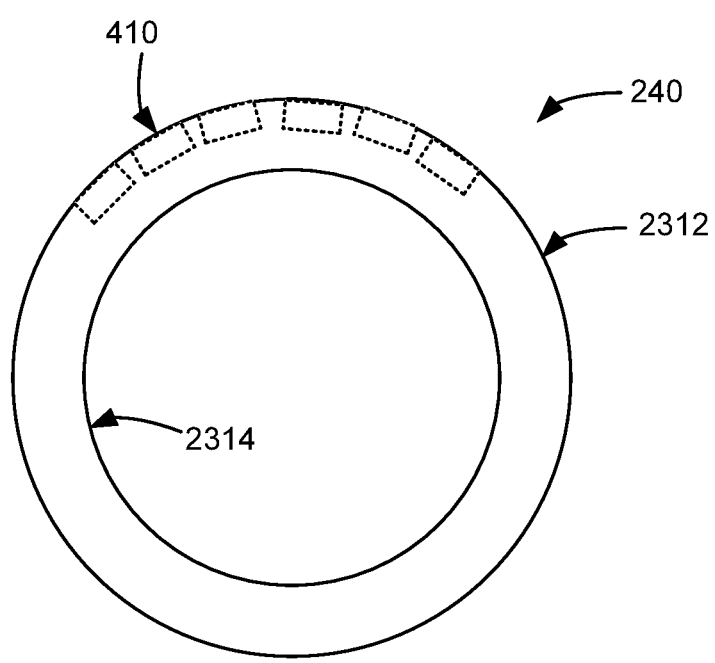
FIG. 24 depicts one embodiment in which the pattern of stimulation elements resides in a curved surface.
Figure 25:
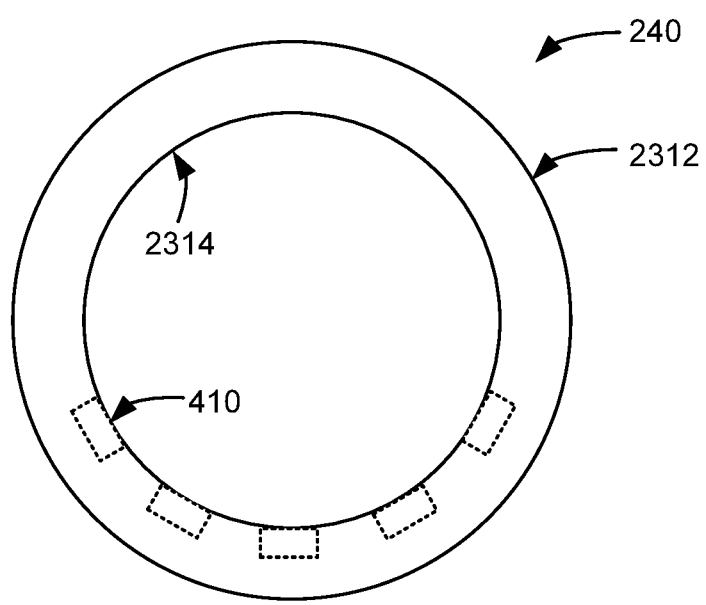
FIG. 25 depicts another embodiment in which the pattern of stimulation elements resides in a curved surface.

One technical problem to overcome with respect to haptic stimulation devices is to provide a form factor that will be effective at stimulating the user's senses, yet is also convenient to use. The haptic stimulation device 240 may have a variety of form factors. FIGS. 23-25 depict a few embodiments of different form factors. Not all elements of the haptic stimulation device 240 are depicted in FIGS. 23-25, so as to better focus on the form factors. FIG. 23 depicts one embodiment in which the haptic stimulation device 240 has a ring-shaped form factor. The haptic stimulation device 240 has a ring-shaped member 2302 which is configured to fit on a human finger, in one embodiment. The ring-shaped member 2302 is physically attached to the stimulation interface 250. The stimulation elements 410 are exposed on the upper surface of the stimulation interface 250 such that the user can place a finger (different from the one on which the ring-shaped member 2302 surrounds) on the upper surface of the stimulation interface 250, wherein the stimulation elements 410 may stimulate receptors in the user's skin.

The surface of the stimulation interface 250 can have a variety of shapes. In one embodiment, the surface of the stimulation interface 250 is substantially planar. FIG. 23 depicts one embodiment in which the surface of the stimulation interface 250 is substantially planar. Thus, the pattern of stimulation elements 410 resides in a surface that is substantially planar, in one embodiment.

In one embodiment, the pattern of stimulation elements 410 resides in a curved surface. FIG. 24 depicts one embodiment in which the pattern of stimulation elements 410 resides in a curved surface. Also, the stimulation elements 410 reside in an outer ring surface 2312 of a ring-shaped member, in this embodiment. Thus, the pattern of stimulation elements 410 is configured to stimulate the receptors in the skin via the outer ring surface 2312. The inner ring surface 2314 is also depicted.

FIG. 25 depicts another embodiment in which the pattern of stimulation elements 410 resides in a curved surface. In this embodiment, the stimulation elements 410 reside in an inner ring surface 2314 of a ring-shaped member. Thus, the pattern of stimulation elements 410 is configured to stimulate the receptors in the skin via the inner ring surface 2314. Therefore, the stimulation elements 410 may stimulate receptors in the finger on which the ring-shaped member 2302 is worn.

A ring-shaped form factor such as in FIG. 23, 24, or 25 solves technical challenges in how to effectively interface with the user's senses. A ring-shaped form factor such as in FIG. 23, 24, or 25 solves technical challenges in how to effectively interface with the user's senses, while being a convenient form factor. The ring-shaped form factor is not cumbersome, but rather is quite convenient for the user to wear. Even if the ring-shaped form factor has a limited surface contact with the user's skin, the information can be effectively transferred to the user due to the sensitivity of the skin receptors in the user's fingers.

The haptic stimulation device 240 may have many other form factors. In one embodiment, the haptic stimulation device 240 has a member configured to fit around a human wrist. Moreover, the haptic stimulation interface 250 may be configured to be adjacent to the human wrist. Therefore, the stimulation elements 410 may stimulate receptors in the wrist on which the haptic stimulation device 240 is worn. The form factor depicted in FIG. 25 could be configured to fit around a human wrist.

In one embodiment, the haptic stimulation device 240 has a member configured to fit around a human neck. Moreover, the haptic stimulation interface 250 may be configured to be adjacent to the skin of a human neck. Therefore, the stimulation elements 410 may stimulate receptors in the neck of the user.

In one embodiment, the haptic stimulation device 240 is configured to be worn as a headband. Moreover, the haptic stimulation interface 250 may be configured to be adjacent to the skin of the forehead. Therefore, the stimulation elements 410 may stimulate receptors in the forehead of the user.

In one embodiment, the haptic stimulation device 240 is configured to be worn around the user's forearm. Thus, the haptic stimulation interface 250 may be configured to be adjacent to the forearm. Therefore, the stimulation elements 410 may stimulate receptors in the forearm of the user.

The stimulation elements 410 may stimulate receptors in other parts of the body than fingers, wrist, forearm, forehead, and neck. In general, the stimulation elements 410 may stimulate receptors in skin on any part of the body.

In one embodiment, two or more haptic stimulation interfaces 250 are employed by the user at the same time. For example, if the haptic stimulation device 240 comprises a form factor of a ring, the user can wear two or more ring sharped devices. Thus, a separate haptic stimulation interface 250 may be used to stimulate the receptors in different fingers of the user. In one embodiment, different information is sent to the different haptic stimulation interfaces 250, such that the user receives different sensations from each of the haptic stimulation interfaces 250. For example, the different fingers of the user may receive different information from the UE 110. In one embodiment, a different presentation mode may be used for the different haptic stimulation interfaces 250. For example, a spatial presentation mode may be used in a first haptic stimulation interface 250 and a temporal presentation mode may be used in a second haptic stimulation interface 250.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Computer readable storage media is an example of a non-transitory computer-readable medium. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware control circuit components. For example, and without limitation, illustrative types of hardware control circuit components that can be used include Field-programmable Gate Arrays (FPGAs), Application-specific Integrated Circuits (ASICs), Application-specific Standard Products (ASSPs), System-on-a-chip systems (SOCs), Complex Programmable Control circuit Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims.

What is claimed is:

1. A haptic stimulation system comprising:
  a haptic stimulation interface comprising a pattern of stimulation elements configured to stimulate receptors in skin of a user;
  a control circuit configured to present information in the haptic stimulation interface in accordance with a presentation mode tailored to the user based on user input; and
  a user interface configured to receive a user selection of a level of complexity of how the information is presented in the haptic stimulation interface, wherein the control circuit is configured to select the presentation mode based on the level of complexity,
    wherein to present the information in the haptic stimulation interface in accordance with the presentation mode the control circuit is further configured to:
    in response to selection of the presentation mode being a low level of complexity corresponding to a first mode, present a binary indication of the information in the haptic stimulation interface,
    in response to selection of the presentation mode being a medium level of complexity corresponding to a second mode, present a symbol in the pattern of the information in the haptic stimulation interface, and
    in response to selection of the presentation mode being a high level of complexity corresponding to a third mode, present a waveform in the pattern of the information in the haptic stimulation interface.

2. The haptic stimulation system of claim 1, wherein to present the information in the haptic stimulation interface in accordance with the presentation mode the control circuit is further configured to:
  map symbolic representations of letters, visual waveform representations of sounds of letters, symbolic representations of digital information to the pattern of stimulation elements, or symbolic representations of characters for writing in a language in response to the presentation mode being a fourth mode; and
  map symbolic representations of words, visual waveform representations of sounds of words, visual waveform representations of sounds of digital information, or visual waveform representations of sounds in the language to the pattern of stimulation elements in response to the presentation mode being a fifth mode.

3. The haptic stimulation system of claim 1, wherein to present the information in the haptic stimulation interface in accordance with the presentation mode the control circuit is further configured to:
  spatially map an image to the pattern of stimulation elements in response to the presentation mode being a fourth mode; and
  temporally map an image to groups of elements in the pattern of stimulation elements in response to the presentation mode being a fifth mode.

4. The haptic stimulation system of claim 1, wherein the control circuit is further configured to increase a level of complexity of how the information is presented in the haptic stimulation interface in response to the user adapting to the haptic stimulation interface.

5. The haptic stimulation system of claim 1, further comprising:
  a wireless communication interface configured to receive information to be presented in the haptic stimulation interface, wherein the control circuit is further configured to map digital data received on the wireless communication interface to the pattern of stimulation elements in order to present the information in the haptic stimulation interface; and
  a wireless communication device, wherein the wireless communication device is configured to provide the digital data to the wireless communication interface.

6. The haptic stimulation system of claim 1, further comprising a ring-shaped member configured to fit on a human finger, wherein the ring-shaped member has an inner ring surface and an outer ring surface, and wherein the pattern of stimulation elements is configured to stimulate the receptors in the skin via the inner ring surface and stimulate the receptors in the skin via the outer ring surface.

7. The haptic stimulation system of claim 1, wherein the pattern of stimulation elements comprises a pattern of electrodes configured to stimulate the receptors in the skin, a pattern of electromechanical transducers configured to stimulate the receptors in the skin through mechanical vibration of each of the electromechanical transducers, a pattern of electroacoustic transducers configured to stimulate the receptors in the skin through mechanical vibration of the electroacoustic transducers, or a pattern of electrothermal transducers configured to stimulate the receptors in the skin through temperature of each of the electrothermal transducers.

8. The haptic stimulation system of claim 1, wherein the information comprises text and the control circuit is further configured to:
  represent the text in a shape that physically maps to the text in order to tailor the presentation mode to the user, or
  convert the text into a non-textual image that represents the text in order to tailor the presentation mode to the user.

9. The haptic stimulation system of claim 1, wherein the information comprises sound and the control circuit is further configured to:
  convert the sound into a visual representation of the sound in order to tailor the presentation mode to the user; and
  present the visual representation of the sound in the haptic stimulation interface.

10. A method for haptic presentation of information to a user, the method comprising:
  receiving user input that selects a level of complexity of how the information is presented in a haptic stimulation interface;
  tailoring a presentation mode to a user of a haptic stimulation interface comprising a pattern of stimulation elements, wherein the presentation mode is tailored to the user based on the level of complexity; and
  stimulating receptors in skin of the user with the pattern of stimulation elements in order to present the information in accordance with the presentation mode selected based on received user input, wherein to present the information in the haptic stimulation interface in accordance with the presentation mode further includes:
    in response to selection of the presentation mode being a low level of complexity corresponding to a first mode, presenting a binary indication of the information in the haptic stimulation interface,
    in response to selection of the presentation mode being a medium level of complexity corresponding to a second mode, presenting a symbol in the pattern of the information in the haptic stimulation interface, and
    in response to selection of the presentation mode being a high level of complexity corresponding to a third mode, presenting a waveform in the pattern of the information in the haptic stimulation interface.

11. The method of claim 10, wherein tailoring the presentation mode to the user comprises:
  mapping symbolic representations of letters or visual waveform representations of sounds of letters to the pattern of stimulation elements in response to the presentation mode being a fourth mode; and
  mapping symbolic representations of words or visual waveform representations of sounds of words to the pattern of stimulation elements in response to the presentation mode being a fifth mode.

12. The method of claim 10, wherein tailoring the presentation mode to the user comprises:
  spatially mapping an image to the pattern of stimulation elements in response to the presentation mode being a fourth mode; and
  temporally mapping an image to columns in the pattern of stimulation elements in response to the presentation mode being a fifth mode.

13. The method of claim 11, wherein tailoring the presentation mode of the information to the user comprises increasing a level of complexity of how the information is presented in the haptic stimulation interface in response to the user adapting to the haptic stimulation interface.

14. A non-transitory computer-readable medium storing computer readable instructions for providing haptic communication, that when executed by one or more processors, cause the one or more processors to:
- receive user input that selects a level of complexity of how information is presented in a haptic stimulation interface;
- access information to be presented in a haptic stimulation interface comprising a pattern of stimulation elements configured to stimulate receptors in skin of a user;
- tailor a presentation mode to the user, wherein the presentation mode is tailored to the user based on the level of complexity; and
- cause information to be presented in the haptic stimulation interface in accordance with the presentation mode selected based on received user input, wherein to present the information in the haptic stimulation interface in accordance with the presentation mode further comprises to:
  - in response to selection of the presentation mode being a low level of complexity corresponding to a first mode, present a binary indication of the information in the haptic stimulation interface,
  - in response to selection of the presentation mode being a medium level of complexity corresponding to a second mode, present a symbol in the pattern of the information in the haptic stimulation interface, and
  - in response to selection of the presentation mode being a high level of complexity corresponding to a third mode, present a waveform in the pattern of the information in the haptic stimulation interface.

15. The non-transitory computer-readable medium of claim 14, wherein the computer readable instructions that when executed by one or more processors, cause the one or more processors to tailor the presentation mode to the user cause the one or more processors to:
- map symbolic representations of letters or visual waveform representations of sounds of letters to the pattern of stimulation elements in response to the presentation mode being a fourth mode; and
- map symbolic representations of words or map visual waveform representations of sounds of words to the pattern of stimulation elements in response to the presentation mode being a fifth mode.

16. The method of claim 10, wherein the information comprises text and the method further comprises:
- representing the text in a shape that physically maps to the text in order to tailor the presentation mode to the user, or
- convert the text into a non-textual image that represents the text in order to tailor the presentation mode to the user.

17. The non-transitory computer-readable medium of claim 14, wherein the computer readable instructions that when executed by one or more processors, cause the one or more processors to tailor the presentation mode to the user cause the one or more processors to:
- spatially map an image to the pattern of stimulation elements in response to the presentation mode being a fourth mode; and
- temporally map an image to columns in the pattern of stimulation elements in response to the presentation mode being a fifth mode.

18. The non-transitory computer-readable medium of claim 16, wherein the computer readable instructions that when executed by one or more processors, cause the one or more processors to send the information to the haptic stimulation interface via wireless communication.

19. The non-transitory computer-readable medium of claim 14, wherein the computer readable instructions that when executed by one or more processors, cause the one or more processors to increase a level of complexity of how the information is presented in the haptic stimulation interface in response to the user adapting to the haptic stimulation interface.

20. The non-transitory computer-readable medium of claim 14, wherein the information comprises text and wherein the computer readable instructions that when executed by one or more processors, cause the one or more processors to:
- represent the text in a shape that physically maps to the text in order to tailor the presentation mode to the user, or
- convert the text into a non-textual image that represents the text in order to tailor the presentation mode to the user.

* * * * *

UNITED STATES PATENT AND TRADEMARK OFFICE
CERTIFICATE OF CORRECTION

PATENT NO. : 12,105,877 B2
APPLICATION NO. : 17/373380
DATED : October 1, 2024
INVENTOR(S) : Jun Xu et al.

It is certified that error appears in the above-identified patent and that said Letters Patent is hereby corrected as shown below:

In the Claims

Column 30, Claim 13, Lines 61-65, should read:
13. The method of claim 10, wherein tailoring the presentation mode of the information to the user comprises increasing a level of complexity of how the information is presented in the haptic stimulation interface in response to the user adapting to the haptic stimulation interface.

Column 32, Claim 18, Lines 19-23, should read:
18. The non-transitory computer-readable medium of claim 14, wherein the computer readable instructions that when executed by one or more processors, cause the one or more processors to send the information to the haptic stimulation interface via wireless communication.

Signed and Sealed this
Third Day of December, 2024

Katherine Kelly Vidal
*Director of the United States Patent and Trademark Office*